United States Patent [19]

Osada et al.

[11] Patent Number: 5,289,292
[45] Date of Patent: Feb. 22, 1994

[54] PICTURE ELEMENT DATA DENSITY CONVERSION APPARATUS

[75] Inventors: Masaru Osada, Noda; Takashi Kuriyama, Yokohama, both of Japan

[73] Assignee: Victor Company of Japan, Ltd., Yokohama, Japan

[21] Appl. No.: 887,498

[22] Filed: May 26, 1992

[30] Foreign Application Priority Data

May 24, 1991 [JP] Japan .................................. 3-149869

[51] Int. Cl.⁵ .................... H04N 1/387; G06F 15/66
[52] U.S. Cl. ..................... 358/451; 358/338; 358/342; 358/428; 382/27; 382/48; 382/53; 348/384; 348/438
[58] Field of Search .............. 358/80, 75, 77, 457, 358/443, 447, 451, 44, 41, 43, 160, 163, 167, 336, 314, 21 R, 455, 464, 67, 213, 212, 126, 222, 150, 127, 428, 85, 213.12, 148.48, 166, 140, 79, 283, 47, 54, 338, 342; 355/38; 382/27, 48, 53; 357/30, 22

[56] References Cited

U.S. PATENT DOCUMENTS

| | | | |
|---|---|---|---|
| 4,305,022 | 12/1981 | Mitamura et al. | 358/67 X |
| 4,410,914 | 10/1983 | Siau | 358/222 |
| 4,614,977 | 9/1986 | Kawahara et al. | 358/428 |
| 4,809,343 | 2/1989 | Wakabayashi et al. | 382/27 |
| 5,089,900 | 2/1992 | Yokogawa | 358/338 |
| 5,121,219 | 6/1992 | Yokogawa | 358/338 |
| 5,124,808 | 6/1992 | Yokogawa | 358/338 |

FOREIGN PATENT DOCUMENTS

63-311868 12/1988 Japan .
2-70258 5/1990 Japan .
2-187871 7/1990 Japan .

*Primary Examiner*—Paul Ip
*Attorney, Agent, or Firm*—Lowe, Price, LeBlanc & Becker

[57] ABSTRACT

A picture element data density conversion apparatus, enabling arbitrary amounts of data density reduction to be independently selected for the horizontal (i.e. main) and vertical (i.e. secondary) scanning directions of a picture field, executes processing along a continuous path in which horizontally successive input values along each line of the field are first periodically selected and horizontal weighted averaging between specific pairs of these selected values is executed, then periodic selection of successive lines of the horizontal weighted average values thus obtained is executed, and vertical weighting averaging between vertically corresponding pairs of values in the selected line pairs is performed, to obtain density-reduced output data.

8 Claims, 18 Drawing Sheets

| $D_1$ | $D_2$ | $D_3$ | $D_4$ | $D_5$ | $D_6$ |
|---|---|---|---|---|---|
| $D_7$ | | | | | |
| | | | | | |
| | | | | | |
| | | | | | |
| $D_{31}$ | | | | | $D_{36}$ |

| $D_1'$ | $D_2'$ | $D_3'$ | $D_4'$ | $D_5'$ |
|---|---|---|---|---|
| $D_6'$ | | | | |
| $D_{11}'$ | | | | |
| $D_{16}'$ | | | | |
| $D_{21}'$ | | | | $D_{25}'$ |

$$D_n' = (1-K_n)D_n + K_n \cdot D_{n+1}$$

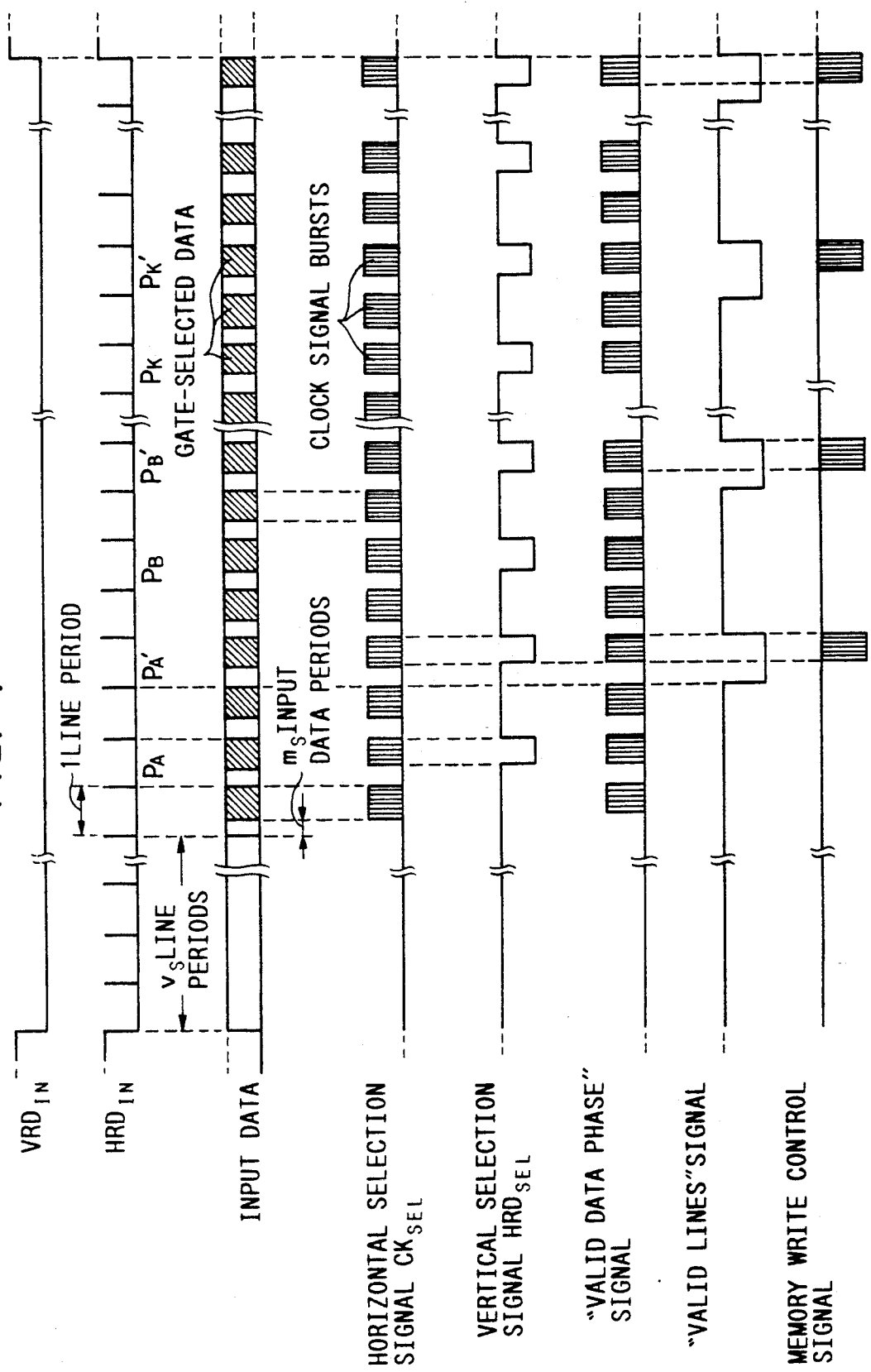

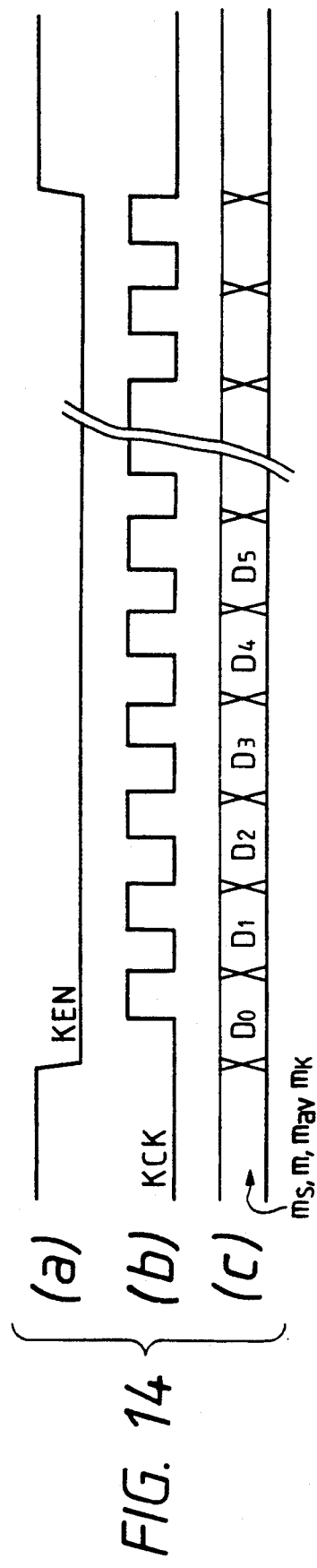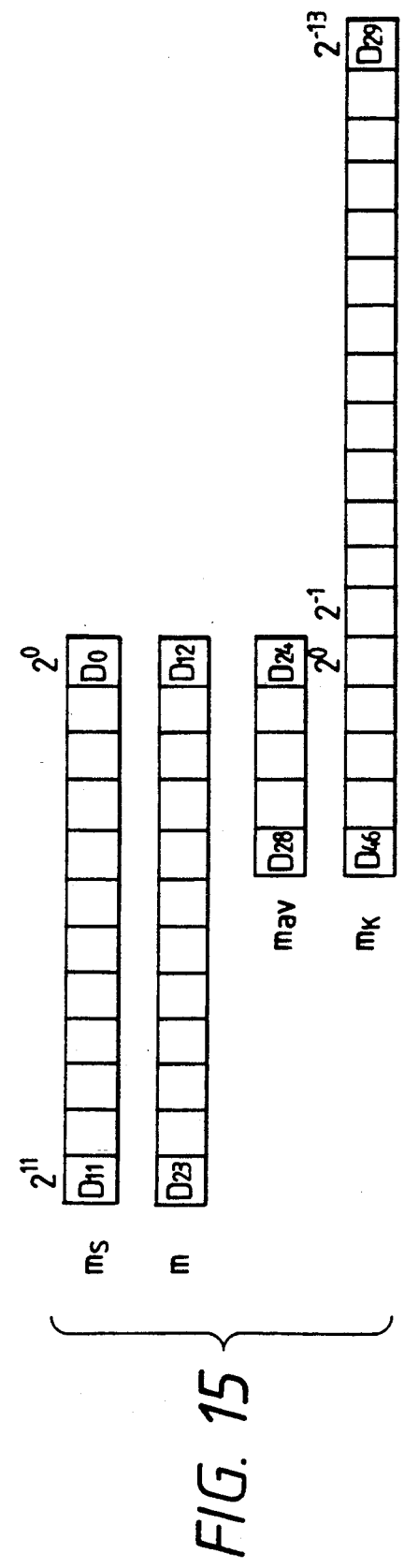

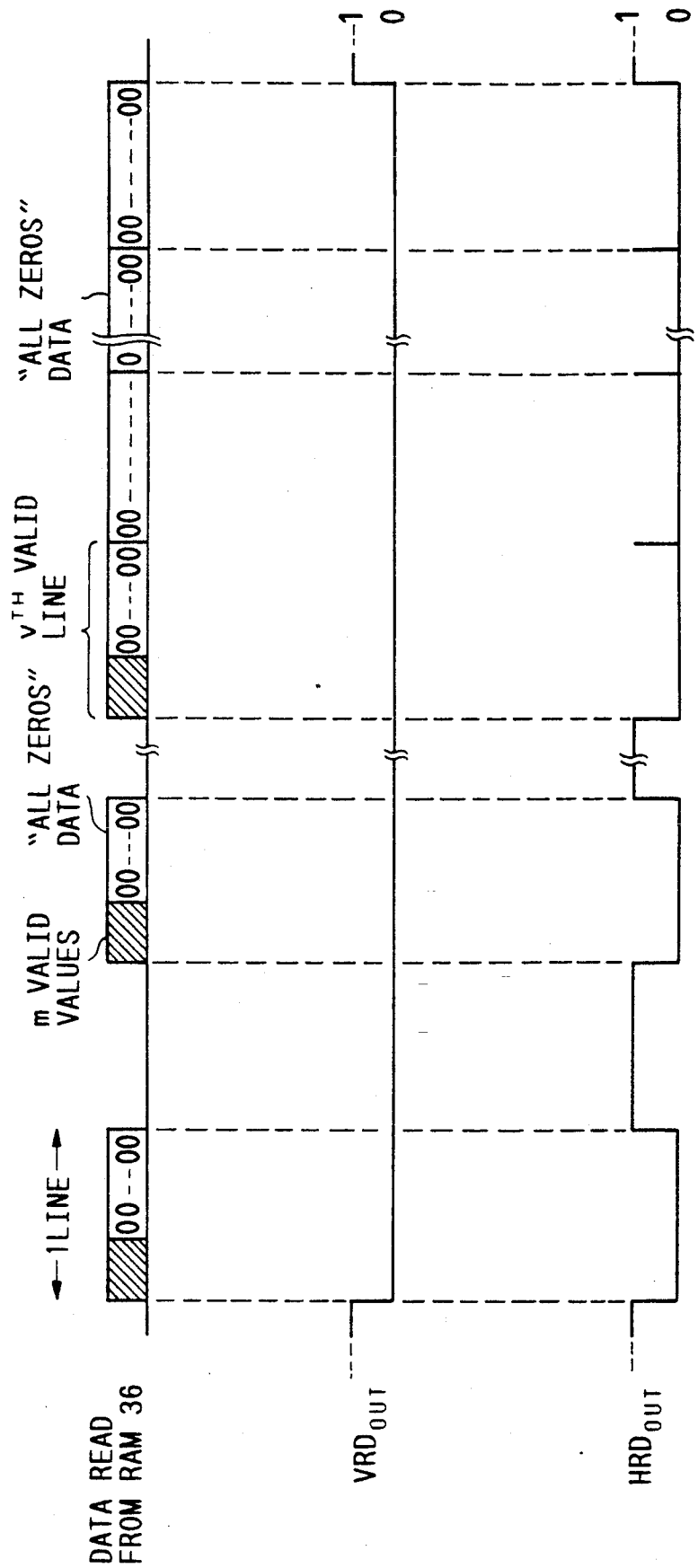

PICTURE ELEMENT DATA DENSITY CONVERSION APPARATUS

BACKGROUND OF THE INVENTION

1. Field of the Invention

The present invention relates to an apparatus for operating on picture element data representing a picture or a selected region of a picture as a plurality of picture elements, to obtain picture element data which represent that picture or selected region as a different number of picture elements.

More particularly the invention relates to a picture element data density conversion apparatus whereby such data can be converted to picture element data having a lower density, for thereby enabling the picture or selected region to be displayed or printed in compressed size with an arbitrarily selected degree of compression.

2. Description of the Prior Art

Various types of apparatus for effecting a reduction of picture element data density have been proposed in the prior art. Such an apparatus is applicable for example to a copier apparatus, to enable selective reduction in size of an image or selected region of an image that is copied.

In the prior art, one method of achieving such selective size variation of copies produced by a copier apparatus has been to use an optical lens having a zoom capability. However due to the requirement for a high degree of optical accuracy, use of such an optical lens in a copier apparatus will result in a substantial increase in the manufacturing cost. Furthermore it is inherently difficult to achieve a sufficiently high degree of performance from such a lens.

Other methods have therefore been proposed, which are based upon picture element data density variation, to achieve an arbitrary amount of change (in general, compression) of the size of an original picture or region of an original picture. It should be noted that the term "picture" is used herein in a very general sense, to include for example a picture that is conveyed by a field of a television signal, a printed page of text, etc. FIGS. 1A, 1B are simple diagrams to illustrate the basic concept of picture element data density conversion and picture size compression. In FIG. 1A, an array of picture elements of an original picture are represented by corresponding values D1, D2, ..., D36, which have been obtained for example by optically scanning the picture. If the picture is to be printed out or displayed in compressed size, by comparison with the size which would be obtained by using the set of values D1 to D36, and assuming that the desired compression factor is 5/6 in the horizontal and vertical directions for example, then that is achieved by first converting the set of values D1 to D36 to a 2-dimensionally reduced-density set of values D1', D2', ..., D25' as shown in FIG. 3. The derived reduced-density values may occur intermittently, i.e. may not be continuously sequential along the time axis, so that it is then necessary to execute time axis compression in order to convert the data to suitable form for obtaining a compressed-size picture. That is generally done by writing the density-reduced values into a buffer memory, then reading the values out in a continuous sequence.

One method which uses a hardware technique for reducing the data density of a digital picture element signal employs a line image sensor which produces the picture element data by scanning across an original picture, with the line image sensor being moved in a secondary (e.g. vertical) scanning direction while being scanned across the picture in the main (e.g. horizontal) scanning direction. A reduced picture element data density is thereby achieved, by comparison with operation in which the line image sensor is not moved in the secondary scanning direction while moving in the main scanning direction. However such a method presents basic problems in the case of a color scanning operation. In general, a color line image sensor is formed of respective sensors for the primary colors, which are arrayed in the secondary scanning direction, so that these normally move in parallel across the picture being scanned, in the main scanning direction. However if such a color line image sensor is moved in the secondary scanning direction while moving in the main scanning direction, it becomes extremely difficult to properly combine the respective color output signals produced from the color line image sensor, and it is found that spurious signal components arise.

Other methods have been proposed in the prior art whereby software operation, i.e. computer processing, is used to reduce the picture element data density of a signal representing a picture or a region of a picture. However with such prior art methods, it is found that a relatively large amount of processing time is required, so that it becomes impossible to achieve certain types of real-time operation, such as size compression of a selected region of a moving picture.

SUMMARY OF THE INVENTION

It is an objective of the present invention to overcome the disadvantages of the prior art set out above, by providing a picture element data density conversion apparatus whereby an arbitrary degree of reduction of picture element data density in a 2-dimensional data field can be achieved, and whereby a reduction of picture element data density within a selected region of a picture can be achieved. Arbitrary amounts of compression in the horizontal and/or vertical direction can thereby be achieved.

It is a further objective of the present invention to provide a picture element data density conversion apparatus whereby a high speed of processing can be achieved and all of the density-reduced output data for an input data field can be derived within the time that the input data field is being supplied to the apparatus, so that real-time processing becomes possible, and the invention can be applied to moving picture data such as video signal data.

To achieve the above objectives, each of the input picture element values supplied to the apparatus is supplied to a processing path in which processing for data density reduction in one scanning direction of the input data field is followed by processing for data density reduction in the other scanning direction. No storage of intermediate results obtained during these two types of processing is necessary, thereby making possible the aforementioned real-time processing capability.

More specifically, the present invention provides a picture element data density conversion apparatus for processing successive input picture element values to effect a reduction of picture element data density within a 2-dimensional input data field formed of a plurality of lines of the input picture element values, each line being oriented in a horizontal scanning direction of the field, the lines being sequentially arranged in a vertical scanning direction of the field, the input picture element values occurring with a fixed input data period, the lines occurring with a fixed line period, the apparatus comprising:

horizontal digital low pass filter means for operating on the input picture element values to obtain respective horizontally filtered picture element values;

first delay means for delaying the horizontally filtered picture element values by a delay amount which is equal to the input data period multiplied by a first predetermined integer, to thereby obtain successive parallel pairs of delayed and non-delayed horizontally filtered picture element values;

horizontal selection means for generating a horizontal selection signal for periodically designating respective ones of the pairs of delayed and non-delayed horizontally filtered picture element values, the designation being executed with a horizontal selection period which is equal to the input data period multiplied by the first predetermined integer;

horizontal weighting coefficient generating means responsive to the horizontal selection signal for detecting, in accordance with a predetermined weighted averaging interpolation period which is a predetermined multiple of the horizontal selection period, each of the horizontally filtered delayed and non-delayed picture element value pairs designated by the horizontal selection means for which a valid horizontal weighted average picture element value can be derived, and further for generating a first validity indication signal in synchronism with each picture element value pair for which a valid weighted average value can be derived, and for computing respective horizontal weighting coefficients to be applied to the picture element value pair;

horizontal weighted averaging means for applying the horizontal weighting coefficients to corresponding ones of the pairs of horizontal filtered delayed and non-delayed picture element value pairs, to sequentially derive respective horizontal weighted average picture element values;

vertical digital low pass filter means for operating on the horizontal weighted average picture element values to obtain respective vertically filtered picture element values;

second delay means for delaying the horizontally filtered picture element values by a delay amount which is equal to the line period multiplied by a second predetermined integer to obtain successive parallel pairs of lines of delayed and non-delayed vertically filtered picture element values;

vertical selection means for generating a vertical selection signal for periodically designating respective ones of the pairs of lines of delayed and non-delayed vertically filtered picture element values, the designation being executed with a period which is equal to the line period multiplied by the second predetermined integer;

vertical weighting coefficient generating means controlled by the vertical selection signal for detecting, in accordance with a predetermined weighted averaging interpolation period each of the vertically filtered delayed and non-delayed picture element value line pairs designated by the vertical selection means for which valid vertical weighted average picture element values can be derived, for generating a second validity indication signal in synchronism with each line pair for which valid vertical weighted average values can be derived, and for computing a first vertical weighting coefficient to be applied to each picture element value of a first one of each line pair and a second vertical weighting coefficient to be applied to each picture element value of a second one of each line pair; and vertical weighted averaging means for applying the vertical weighting coefficients to corresponding ones of the line pairs, to sequentially derive respective lines of vertical weighted average picture element values.

Such an apparatus can further comprise 2-dimensional region selection gate circuit means for selecting respective ones of the input picture element values which constitute a predetermined region formed of a plurality of successive line portions within the input data frame, and for supplying only the selected input picture element values to the horizontal low pass filter means, and means for controlling the horizontal weighting coefficient generating means and vertical weighting coefficient generating means to generate the first and second validity indication signals only at positions in the input data field that are within the predetermined region.

Such a picture element data density conversion apparatus can moreover comprise resampling circuit means controlled by the horizontal selection means for selecting the designated pairs of delayed and non-delayed horizontally filtered values to thereby produce two parallel trains of delayed and non-delayed horizontally filtered values each having a period that is equal to the horizontal selection period, and for supplying the two trains of values to the horizontal weighted averaging means.

Such a picture element data density conversion apparatus may further comprise memory means, and memory control circuit means coupled to receive the vertical weighted average picture element values produced from the vertical weighted averaging means, the memory control circuit means being controlled by at least one of the first and second validity designating signals for selectively writing valid weighted average values produced from the vertical weighted averaging means into the output memory means.

Output picture element values representing a region which is compressed along at least one of the horizontal and vertical directions of the data field can thereby be obtained by read-out from such an output memory.

BRIEF DESCRIPTION OF THE DRAWINGS

FIG. 7 is a timing diagram for describing the operation of the circuit of FIG. 6;

FIG. 14 is a timing diagram of the shift register circuit of FIG. 13, and FIG. 15 shows an example of data formats for parameter values held in the shift register circuit;

FIG. 17 is a timing diagram for FIGS. 16A to 16E.

DESCRIPTION OF PREFERRED EMBODIMENTS

Figure 2:
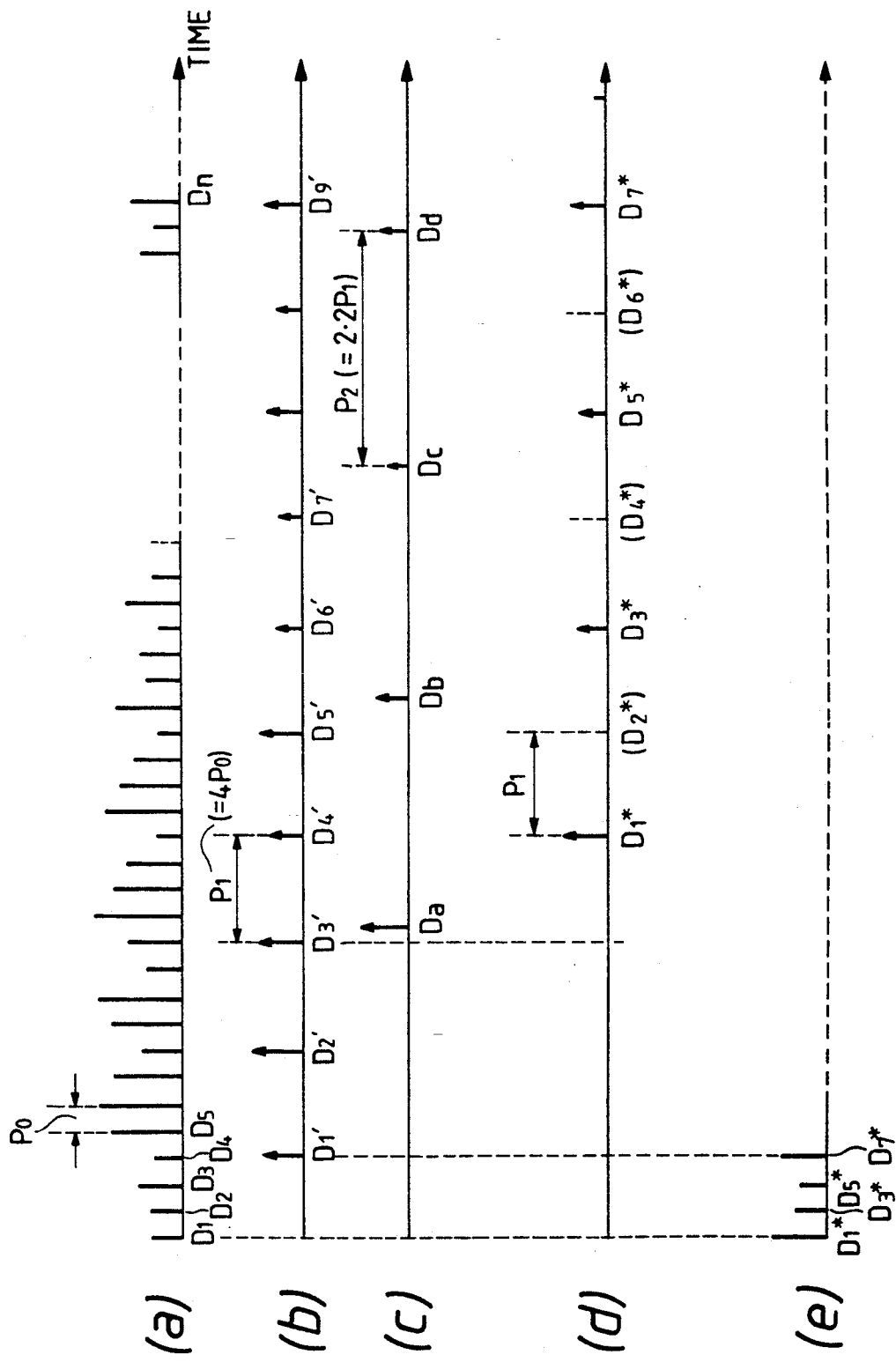
FIG. 2 is a timing diagram for describing the basic principles of picture element data density reduction executed with the present invention.

Before describing an embodiment of a picture element data density conversion apparatus according to the present invention, the basic principles of such an apparatus will be described referring to the timing diagrams of FIG. 2. For simplicity, only picture element data density reduction along the horizontal scanning direction of a picture will be described. In FIG. 2, diagram (a) represents successive time-axis positions of picture element values D1, D2, D3, ... $D_n$ consisting of respective digital values which have been derived, for example, by 2-dimensional scanning of a photo-sensor across an original picture, or values obtained by transferring such values through a digital low pass filter (LPF). For simplicity, the picture element values will be assumed to be monocolor values. It will be assumed that the values D1 to $D_n$ are those of respective picture elements of a single horizontal scan line, however these could equally well be values constituting a selected portion of a scan line, which is to be subjected to density reduction processing. It will be further assumed that picture element data density reduction by a factor 1/8.8 is to be effected, i.e. that the original picture element density will be 8.8 times that of the reduced density. With the present invention, such a density reduction is effected in two successive stages. The factor 8.8 can be expressed as the product of two parameter values, one of which is an integer, for example 4×2.2, or 8×1.1. These two values will be designated in the following as $m_{AV}$ (an integer) and $m_k$ (which can be an integer or fraction), respectively. In the first stage of density reduction, a digital low-pass filtering and data selection operation is executed, to obtain data at a lower rate than that of the input signal. Assuming that the values 4 and 2.2 are to be used in this case, one out of every $m_{AV}$ (in this case, 4) successive values is selected from the output values produced from the low-pass filter. In addition, these values are delayed by $m_{AV}$ (in this example, four) data periods, to obtain two parallel (delayed and non-delayed) data trains. For example as shown in diagram (b) of FIG. 2, assuming that the values of diagram (a) have been outputted from the low pass filter, then the value D1' is selected from D1, D2, D3, D4. Thus the values D1' and D2' will be obtained in parallel, then D2' and D3' in parallel, and so on. Preferably a digital low pass filter is used whereby each output value is obtained as the average of $m_{AV}$ successive input values.

Figures 1A, 1B, 3:
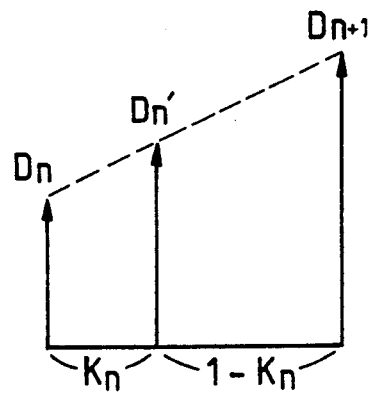
FIGS. 1A, 1B are diagrams for describing 2-dimensional data density reduction.
FIG. 3 is a diagram illustrating weighted averaging interpolation of picture element values.

A weighted averaging operation is executed using each of these successive parallel pairs of selected values. As illustrated in diagram (c) of FIG. 2, the operation is equivalent to establishing periodic interpolation time points with a period which is $m_k$ times (in this example, 2.2 times) the period ($P_1$) of the selected filter-averaged values D1', D2' etc. For each of these interpolation points, a weighted average value is computed as the weighted average value of the two successive selected filter-averaged values between which that interpolation point occurs, with the respective weights assigned to each of these two values being determined in accordance with their respective time-axis distances from that interpolation point. Thus for example the new value $D_a$ is obtained as the weighted average value of D3' and D4', the new value $D_b$ is obtained as the weighted average value of D5' and D6', and so on. The weighted averaging operation is illustrated in FIG. 3, in which assuming that $D_{n+1}$ designates the current picture element value that is being processed and $D_n$ is a previous value, delayed by $m_{AV}$ data periods, then respective weighting coefficients $(1-K_n)$ and $K_n$ are generated and an interpolated weighted average value $D_n'$ is obtained as: $(1-K_n) \cdot D_n + K_n \cdot D_{n+1}$ It will be understood that these weighted average values are not derived at the actual time-axis positions shown in diagram (c). They are derived by operating on each pair of filter-averaged values (e.g. D3', D4') in parallel at a time, so that for example the new value $D_a$ is actually obtained immediately following D3', the new value $D_b$ is obtained immediately following D5', and so on. The values that are obtained from the weighted averaging processing will therefore be as shown in diagram (d), ignoring the time delay required to execute the weighted averaging operation. In practice, the weighted averaging circuit may function such that a new output value is derived immediately following each of the selected values D1', D2', etc., i.e. these weighted average values occurring with a data period that is the same ($P_1$) as that of the selected filter-averaged data. However as can be understood from diagrams (b), (c) of FIG. 2, only some of the values derived (i.e. D1* corresponding to $D_a$, D3* corresponding to $D_b$, D5* corresponding to $D_c$, etc.) will be valid weighted average values, with others (D2*, D4*, etc.) being non-valid. It is therefore also necessary to generate information to specify those of the output values from the weighted averaging circuit that are valid weighted average values.

It can thus be understood that the picture element data of diagram (a) have been density-reduced to obtain the valid picture element data of diagram (d). If now these valid picture element data are to be utilized to produce a printed or displayed line of the original picture which is compressed to 1/8.8 times of the original line length, then that can be done by successively writing only the valid picture element data of diagram (d) into a memory (using the aforementioned information specifying valid values), then reading out the data in continuous sequence at an appropriate data rate, and supplying the data to a printing or display device. That is illustrated in diagram (e).

Figure 4:
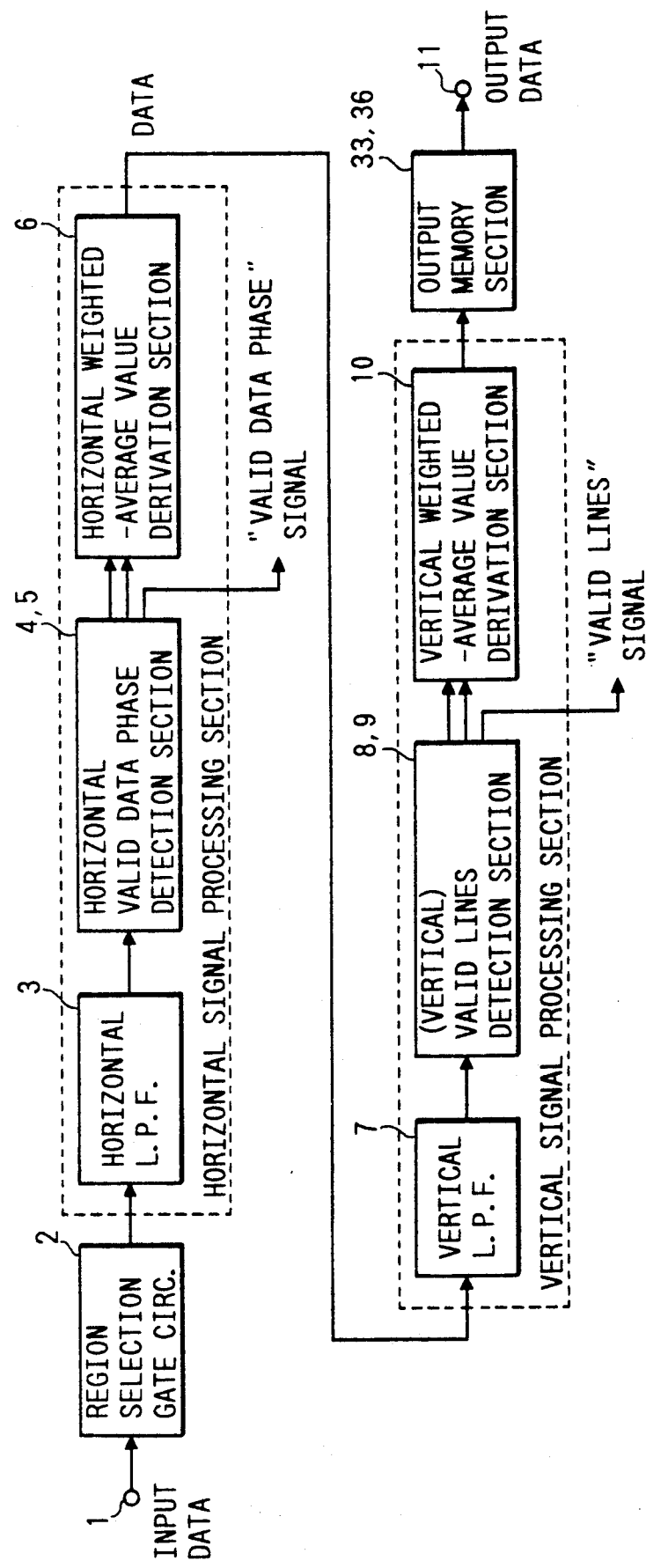
FIG. 4 is a basic block diagram of an embodiment of a picture element data density conversion apparatus according to the present invention.

FIG. 4 is a general block diagram showing the basic configuration of an embodiment of a picture element data density conversion apparatus according to the present invention for density conversion of 2-dimensional picture element data. The picture element data, constituting a picture field, are supplied to an input terminal 1. The data consist of tricolor values, i.e. each picture element value supplied to the input terminal 1 is actually a trio of sequential red, green and blue (R, G, B) values. Although not shown in the drawing, a vertical synchronizing signal for indicating the start and end of the input data field, and a horizontal synchronizing signal consisting of successive pulses to indicate the starting points of respective horizontal lines of picture element values of the field, together with a data clock signal, are also supplied, from an external device which generates the picture element data. That external device may for example be a color scanner apparatus. The input data are first supplied to a region selection gate circuit 2, which is controllable by the user to select an arbitrary region of the picture, to be subjected to 2-dimensional compression. Only the picture element values of the selected region are transferred by the region selection gate circuit 2 to a horizontal signal processing section, in which a first stage consists of a horizontal low pass filter 3, which is preferably a digital transversal filter such as an FIR (Finite Impulse Response) or IIR type of digital filter, and is preferably configured as a tapped FIR digital filter. Successive averaged picture element values from the LPF are supplied to a horizontal valid data phase detection section which is formed of two circuit blocks 4 and 5 as described in detail hereinafter. That section serves to derive the weighting coefficients to be used in horizontal weighted averaging, and to generate a signal which indicates (for each of the selected filter-averaged values) those values for which a valid weighted average value is derived. That section also executes the function described above of selecting one out of every $m_{AV}$ successive filter-averaged values (in each data line), and producing two data trains of the selected values, one of which is delayed by the amount $m_{AV}$ periods of the input data with respect to the other, i.e. successive pairs of parallel selected values.

In addition, that section generates a "valid data phase" signal which specifies, for each of these parallel pairs of values, whether or not a valid weighted average picture element value will be derived from that pair. For example, referring to diagram (d) of FIG. 2, that "valid data phase" signal would selectively designate each of the values D1*, D3*, D5*, D6* as being valid weighted average values.

These successive pairs of picture element data values are then supplied, together with the corresponding pairs of weighting coefficients, to a horizontal weighted averaging circuit 6, which executes the actual horizontal weighted averaging operation.

The output horizontal weighted average picture element values from the horizontal weighted averaging circuit 6 (which include both valid and non-valid values) are then supplied to a vertical signal processing section, whose first stage is a vertical low pass filter circuit 7. In the vertical LPF circuit 7, the output picture element values from the horizontal signal processing section are subjected to vertical low-pass filtering and averaging processing in a similar manner to the aforementioned horizontal low-pass filtering and averaging processing executed by the horizontal LPF 3, but in the vertical direction of the picture field. The vertically filtered picture element values are then supplied to a vertical valid lines detection section, formed of circuit blocks 8, 9 (described in detail hereinafter) which perform similar operations to those of the aforementioned horizontal valid data phase detection section, but acting in the vertical direction of the field. Successive pairs of weighting coefficients that are produced by that section are supplied in parallel to a vertical weighted averaging circuit 10, together with corresponding pairs of lines of picture element values. In addition, a "valid lines" signal is generated, to specify each line of weighted average picture element values produced from the vertical weighted averaging circuit 10 that actually contains valid data.

In this embodiment, time-axis compression of the valid picture element values is then executed in the horizontal direction by writing only the valid data of each valid line into an operation memory then reading out the data so that the valid picture element values become successively adjacent along the time axis. The embodiment is assumed to supply output data to a device such as a color printer having an input buffer memory, and so to simplify the configuration of the output memory section, time axis compression of the valid lines is achieved by the operation of that external buffer memory, as described hereinafter.

It can thus be understood that with this embodiment, picture element data density reduction can be considered as being performed sequentially, first by two successive stages (low-pass filtering/selection of filtered values, then weighted averaging of selected values) in the horizontal picture direction, then by a similar two successive stages of data density reduction in the vertical direction. However in this embodiment, the term "data density" as used in referring to output data derived from the horizontal and vertical weighted averaging operations is to be understood to signify the (horizontal) density of valid values within a line, or (vertical) density of valid lines.

Figure 5:
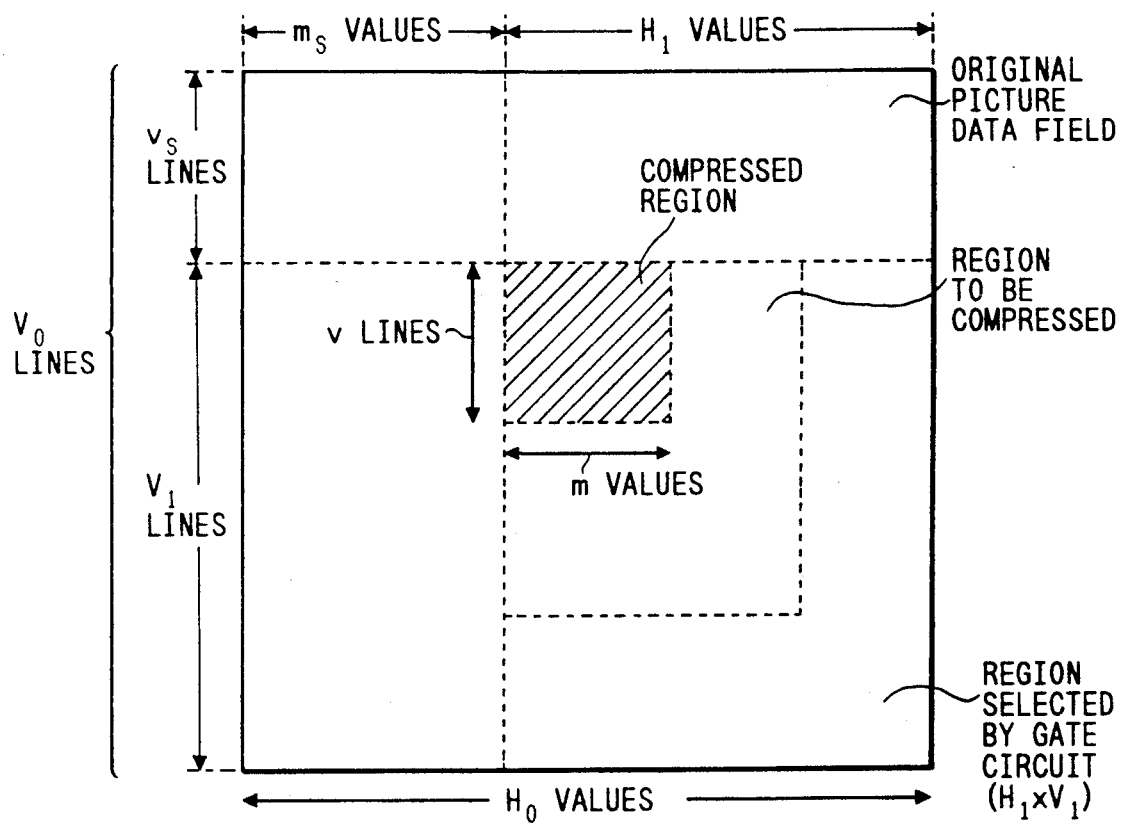
FIG. 5 is a diagram for illustrating relationships between an input picture element value field and a compressed region derived by data density reduction of a predetermined region of the field.

The basic concepts of region selection and region compression operations with this embodiment are illustrated in FIG. 5. Here, the region shown as formed of V1 line portions each consisting of H1 picture element values is selected by the gate circuit 2 described above. That region is then converted by the action of the horizontal and vertical selection operations to consist of V1L line portions each made up of H1L values. The desired final compressed region is specified as being formed of v line portions each consisting of m values, starting from a position which is displaced by $m_s$ values and $v_s$ lines from the start of the field, i.e. the hatched-line region shown in FIG. 5.

In the compression process (with respect to valid data, as described above), it can be considered that the gate-selected region is first density-reduced in the horizontal direction, to be converted to V1 line portions each formed of H1L values (where $H1L=H1/m_{AV}$), then is density-reduced in the vertical direction to be converted to V1l line portions (where $V1L=V/L_{AV}$) each formed of H1L values (where $L_{AV}$ is a predetermined vertical density reduction factor). The first m of these density-reduced values in each of v successive line portions are then written into a line memory, and read out to achieve horizontal time-axis compression. Vertical time-axis compression is subsequently executed by an external apparatus which receives the output data, so that compression to the hatched-line region shown in FIG. 5 is achieved.

It can be understood that, designating the size of the region that is to be compressed as ($H_c$ values × $V_c$ lines), the degree of horizontal compression to be executed is $H_c/m$, and the vertical compression is to be $V_c/v$. Thus the product of the aforementioned horizontal density reduction factors $m_{AV}$ and $m_k$ is obtained as $H_c/m$, while designating the corresponding vertical density reduction factors as $L_{AV}$ and $L_k$, the product of these is obtained as $VO_c/v$. Appropriate values for $m_{AV}$, $m_k$, $L_{AV}$ and $L_k$, as well as for $v_s$, $m_s$ and m, v can thus be established prior to executing a region compression operation, in accordance with the size and position of the region that is to be compressed, and the desired amount of compression.

Various methods could be envisaged for transferring the compressed-region data that is produced, as illustrated in FIG. 5, to an external apparatus such as a printer. It would be possible to send only the data for the compressed region alone. However with the preferred embodiment of the present invention, it is assumed that the output (valid data) picture field produced by the apparatus is to be identical in configuration to the input field. It is therefore necessary to delimit the boundaries of the compressed region, in the output data field. In the embodiment, this is done by setting all picture element values in the field (other than those of the compressed region) to zero. However it would be equally possible to use other methods of delimiting the compressed region. It is also necessary to generate corresponding horizontal and vertical synchronizing signals and a data clock signal corresponding to the output data field.

Figure 6:
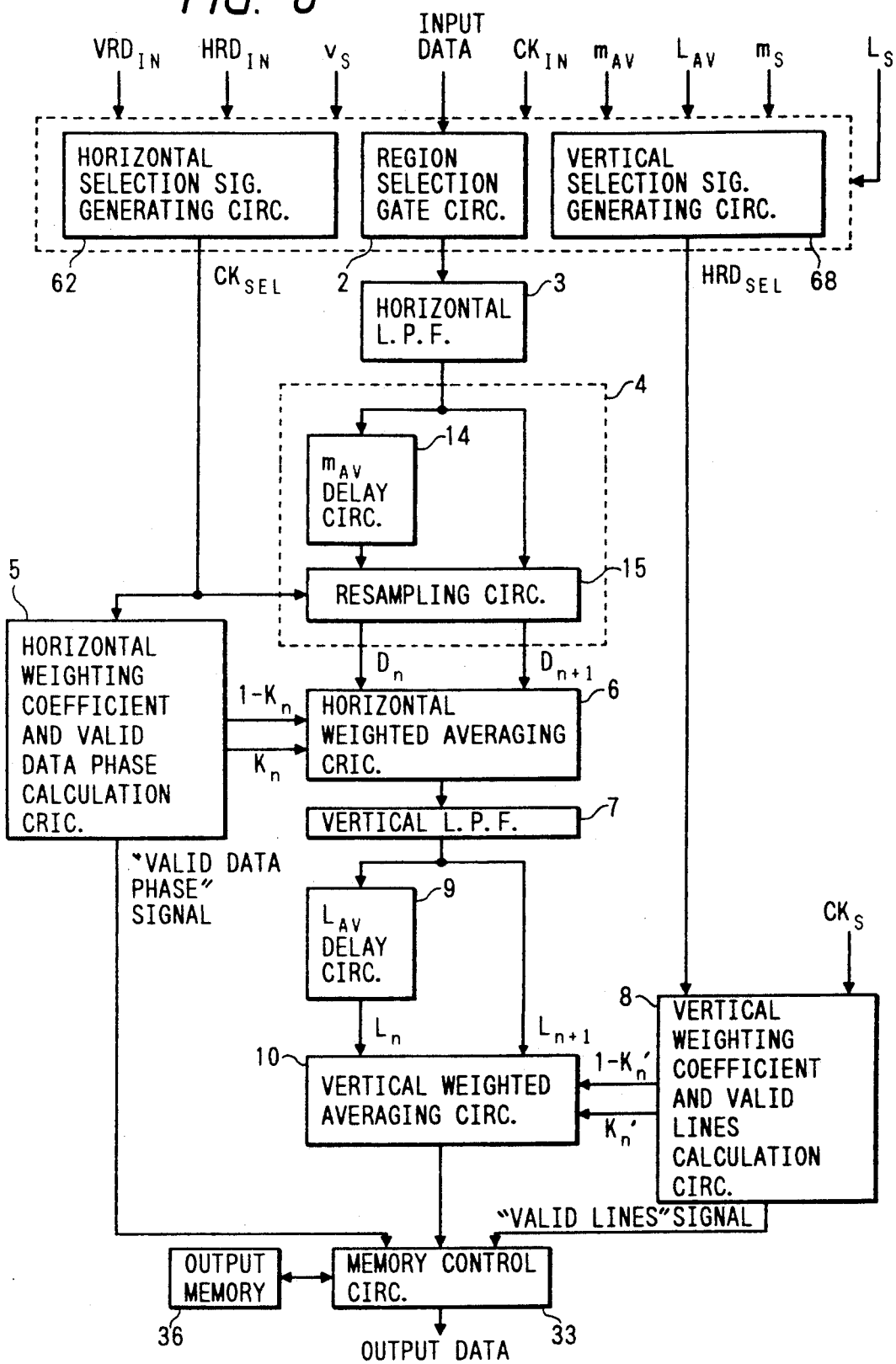
FIG. 6 is a general block circuit diagram of the embodiment of FIG. 4.

FIG. 6 is a more detailed general block diagram of this embodiment, and FIG. 7 is a corresponding timing diagram. The operation will be described for the case of a single input field. An input horizontal synchronizing signal $HRD_{IN}$ defines the positions of respective horizontal lines of picture element values in the input data field, and an input vertical synchronizing signal $VRD_{IN}$ defines the start and end timings of the field. A data clock signal $CK_O$ is also supplied with the input data. These synchronizing signals and data clock signal are supplied, together with $v_s$, $m_s$ and $m_{AV}$, to an input section made up of the region selection gate circuit 2 and a horizontal selection signal generating circuit 62 and vertical selection signal generating circuit 68. The horizontal selection signal generating circuit 62 generates a horizontal selection signal $CK_{SEL}$, having a period $CK_{IN}/m_{AV}$, for executing horizontal selection as described hereinabove. It will be assumed that $CK_{SEL}$ is only generated during each interval in which selected data are being outputted from the region selection gate circuit 2, i.e. in successive bursts, although that is not essential. The vertical selection signal generating circuit 68 similarly generates a vertical selection signal $HRD_{SEL}$, having a similar vertical selection function. Specifically, when $HRD_{SEL}$ goes to the active (logic low) level, this specifies that the current line of picture element values is to be used (together with the line which precedes it by $L_{AV}$ input data periods) for obtaining vertical weighted average values. The output data from the region selection gate circuit 2, after transfer through the horizontal LPF 3, are supplied to a section 4 to be divided into two paths, one of which passes through a delay circuit 14 providing a delay of $m_{AV}$ input data periods, and the two parallel data trains thus obtained are transferred through a resampling circuit 15 which is controlled by the selection clock signal $CK_{SEL}$. One out of every $m_{AV}$ values of each of these two data trains is thereby selected, to obtain two output signals each having the same period as that of $CK_{SEL}$. If the current (non-delayed) output value from the resampling circuit 15 is designated as $D_{n+1}$, then the other value $D_n$ which is outputted in parallel, as shown, will precede $D_n$ by $m_{AV}$ input data periods.

Each of these successive parallel pairs of values is inputted to the horizontal weighted averaging circuit 6, to be operated on by respective weighting coefficients $(1-K_n)$ and $K_n$, which are generated by the horizontal weighting coefficient and valid data phase calculation circuit 5 in synchronism with the selection clock signal $CK_{SEL}$.

When it is detected that a valid horizontal weighted average value will be obtained from the pair of values that are currently being inputted to the horizontal weighted averaging circuit 6, the "valid data phase" signal produced by the horizontal weighting coefficient and valid data phase calculation circuit 5 is set to the active (high) level.

The output data from the horizontal weighted averaging circuit 6 is supplied to the vertical LPF circuit 7, and the resultant output values are transferred through a $L_{AV}$ delay circuit 9 to one input of the vertical weighted averaging circuit 10 and are transferred directly to the other input of the vertical weighted averaging circuit 10. The vertical weighting coefficient and valid lines calculation circuit 8 operates in synchronism with the vertical selection signal $HRD_{SEL}$ to generate respective pairs of weighting coefficients $(1-K_n')$ and $K_n'$. Each picture element value in the current line of picture element values $(L_{n+1})$ that is being outputted from the vertical LPF circuit 7 is multiplied by the weighting coefficient $(1-K_n')$, while each picture element value in the line of picture element values $(L_n)$ which has been delayed by $L_{AV}$ line periods is multiplied by the weighting coefficient $K_n'$. An output line of weighted average values is thereby derived from these two input lines. However, as in the case of horizontal weighted averaging, only some of these output lines will actually contain valid weighted average values. For that reason, the vertical weighting coefficient and valid lines calculation circuit 8 generates a "valid lines" signal as shown in FIG. 7 which goes to the active (low) level during each output line from the vertical LPF circuit 7 for which valid vertical weighted average values can be derived.

That operation can be understood from FIG. 7, in which for example (assuming that the $L_{AV}$ delay circuit 9 produces a delay of two line periods), the "valid lines" signal first indicates that valid vertical weighted average values will be obtained by operating on horizontal weighted average values obtained for the current line $P_A'$ and the delayed line $P_A$, then provides that indication for the lines $P_B'$ and $P_B$, and so on.

The resultant output data from the vertical weighted averaging circuit 10 are supplied to the memory control circuit 33, which is controlled by the "valid data phase" signal and "valid lines" signal to write only the valid weighted average data into the output memory 36, i.e. with a memory write control signal being generated of the form shown in FIG. 7. The valid data are then read out of the output memory 36 by the memory control circuit 33, to be supplied to an external apparatus, with (in this embodiment) time-axis compression in the horizontal direction having been achieved as described hereinabove.

Figure 8A:
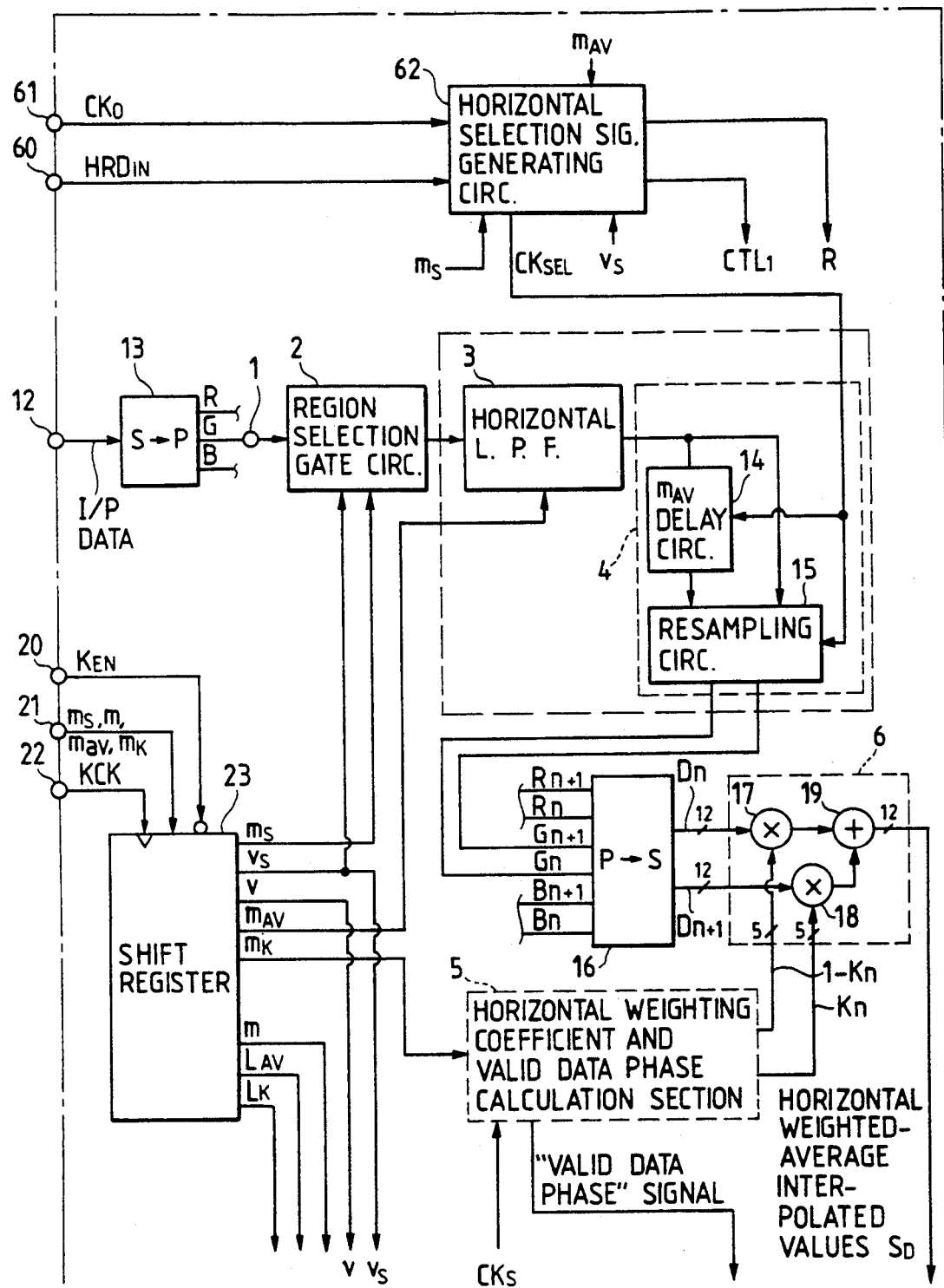
FIGS. 8A, 8B constitute a specific block circuit diagram of the embodiment of FIGS. 4, 6.
Figure 8B:
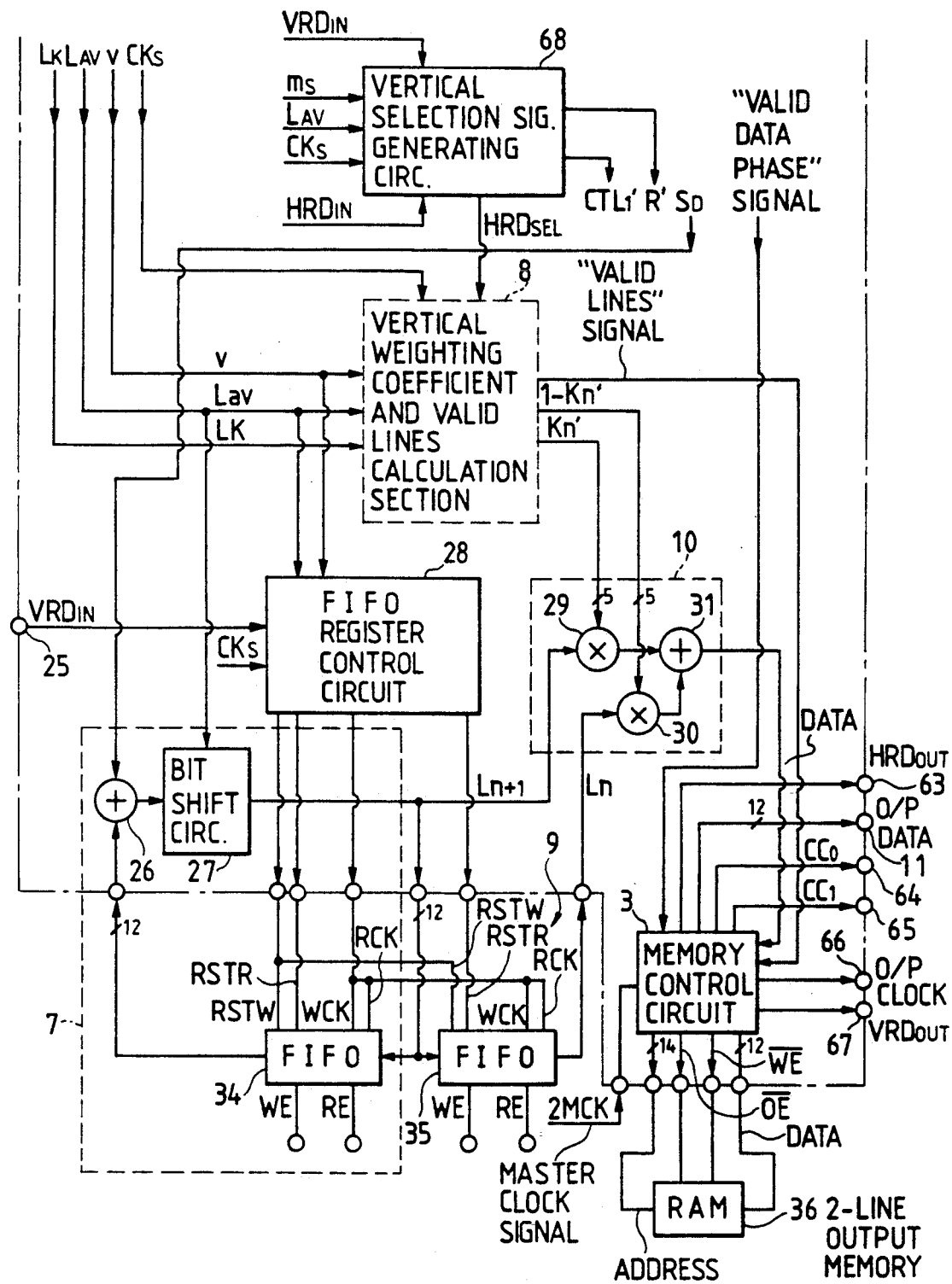

A more specific description of this embodiment will be given referring to FIGS. 8A, 8B, showing a region density reduction apparatus which can be implemented as an integrated circuit, in conjunction with external memory or data register devices. In FIG. 8A, the various parameter values $m_s$, $v_s$, m, v, etc. described hereinabove for specifying the horizontal and vertical degrees of data density reduction and the size and position of the final compressed region, are sequentially supplied to an input terminal 21 to be set into a shift register 23, before the data density operation begins, under the control of a shift clock signal KCK and shift enable signal KEN. The parameter values are thereafter outputted in parallel from the shift register 23 as shown.

These parameter values produced from the shift register 23 are as follows:

(a) The value $v_s$ which specifies the first line of the selected region that is to be compressed, and the value $m_s$ which specifies the first picture element value in the selected region, as shown in FIG. 5;

(b) The values v and m, which specify the number of line portions and the number of picture element values in each line portion, of the desired final compressed region;

(c) Horizontal and vertical selection parameters $m_{AV}$ and $L_{AV}$ which specify the respective degrees of density reduction to be achieved by periodic selection of output values from the horizontal low pass filter and periodic selection of lines of output values from the vertical low pass filter. In this embodiment, these values are also applied to determine the respective frequency characteristics of the horizontal low pass filter and vertical low pass filter;

(d) A value $m_k$ which specifies the amount of data density reduction that is to be effected by weighted averaging of selected pairs of output values from the horizontal LPF (i.e. the ratio of $P_1$ to $P_2$ in the example of FIG. 2, where $m_k=2.2$ in that example). In addition, a value $L_k$ which similarly specifies the amount of density reduction to be achieved by vertical weighted averaging of vertically corresponding pairs of values in selected pairs of lines of output value produced from the vertical LPF.

From the preceding description it can be understood that the following relationships exist:

$$m_{AV}=H1/H1L, \text{ and } L_{AV}=L1/L1L$$

$$m_k=H1L/m, \text{ and } L_k=V1L/v$$

An input data signal which will be assumed to represent a color picture field as described above, consisting of successive serial R, G, B color value trios (each of these trios being referred to in general herein as a "picture element value") is supplied from an external apparatus such as a color scanner through an input terminal 12 to a serial-parallel converter circuit 13, to be converted to successive parallel R, G, B color value trios. A data clock signal $CK_O$ corresponding to the input data is also supplied to an input terminal 61, while a corresponding horizontal synchronizing signal $HRD_{IN}$ and vertical synchronizing signal $VRD_{IN}$ are supplied to input terminals 60, 25 respectively. Although only three circuit blocks 2, 3 and 4 are shown in FIG. 8A, for simplicity of the drawing, it will be understood that three identical sets of these three blocks are provided, for operating in parallel on the R, G and B component values of each picture element value.

The parallel data from the serial-parallel converter 13 are supplied to the region selection gate circuit 2, which selects 2-dimensional picture element data representing the aforementioned region of the input picture field that is to be compressed, as determined by coefficients supplied from the shift register 23, and transfers the selected data to the horizontal low pass filter 3.

The coefficients $m_s$, $v_s$ are supplied to the region selection gate circuit 2, for use in the region selection operation. In addition, $m_s$ and $v_s$ are also supplied to the horizontal selection signal generating circuit 62, together with the input data clock signal ckO, horizontal synchronizing signal $HRD_{IN}$, and horizontal filter factor $m_{AV}$. The horizontal selection signal generating circuit 62 thereby generates the horizontal selection signal $CK_{SEL}$ described hereinabove, and also control signals R and CTL1 used as described hereinafter.

The filter-averaged output values from the horizontal low pass filter 3 are supplied to the section 4, in which the delay circuit 14 (providing a delay of $m_{AV}$ input data periods. i.e. one period of the horizontal selection signal $CK_{SEL}$ as described above) is implemented as an array of D-type flip-flips, each controlled by the horizontal selection signal $CK_{SEL}$ to delay respective parallel bits of each input value. The delayed data and non-delayed data from the horizontal low pass filter 3 are supplied in parallel to respective inputs of the resampling circuit 15, which selects one out of every $m_{AV}$ input values, and thereby produces two parallel output data streams each having the same data rate as signal $CK_{SEL}$. These are supplied to a parallel-serial converter 16, to be returned to a serial data sequence. The R, G and B component values of the current picture element value are designated as $R_{n+1}$, $G_{n+1}$ and $B_{n+1}$, while the corresponding color component values of the immediately preceding picture element value are designated as $R_n$, $G_n$ and $B_n$. After being converted into two serial data trains (i.e. in which each picture element value is expressed as three successive R, G and B values), the data are supplied to the horizontal weighted averaging circuit 6. $D_{n+1}$ designates the current picture element value, while $D_n$ designates the immediately preceding value, and these are supplied to multipliers 18 and 17 respectively of the horizontal weighted averaging circuit 6, to be multiplied by the weighted averaging coefficients $K_n$ and $1-K_n$ respectively, produced from the horizontal weighting coefficient and valid data phase calculation circuit 5, as described above. The resultant horizontal weighted average picture element values are outputted from an adder 19, as the signal designated as $S_D$.

As described hereinabove, each of the successive values thus produced from the horizontal weighted averaging circuit 6 may or may not be a valid horizontal weighted average value, and the timings of the valid values are indicated by the "valid data phase" signal that is also produced from the horizontal weighting coefficient and valid data phase calculation circuit 5. The output data $S_D$ from the horizontal weighted averaging circuit 6 are then supplied to the vertical low pass filter section 7, which is a recursive type of digital filter. This consists of a bit shift circuit 27, which provides a variable amount of delay for executing division by 2 or a multiple of 2, with the amount of bit shifting being equal to $(L_{AV}-1)$, and a FIFO (First-in First-out) register 34 which is controlled by a FIFO register control circuit 28 for producing a delay of one line period. The frequency characteristic of the filter is thereby controlled in accordance with the value of $L_{AV}$, i.e. the greater the value of $L_{AV}$, the lower will be the cut-off frequency.

The $L_{AV}$ delay circuit 9 is made up of a FIFO register 9, which is also controlled by the FIFO register control circuit 28, to delay the output data from the vertical low pass filter circuit 7 by $L_{AV}$ line periods. As a result, considering an output value being produced from the vertical low pass filter circuit 7 as the current picture element value, a corresponding value that is delayed by $L_{AV}$ line periods with respect to that current value is being outputted from the $L_{AV}$ delay circuit 9. Thus it can be considered that while a line of picture element values $L_{n+1}$ is being outputted from the vertical low pass filter circuit 7, a line of picture element values $L_n$ which precedes the first-mentioned line by $L_{AV}$ line periods is being produced from the $L_{AV}$ delay circuit 9.

The output lines of values $L_{n+1}$, $L_n$ are respectively supplied to the multipliers 29 and 30 of the vertical weighted averaging circuit 10, to be multiplied by the weighted averaging coefficients $(1 - K_n')$ and $K_n'$ produced from the vertical weighting coefficient and valid lines calculation circuit 8. Successive vertical weighted average picture element values are thereby produced from the adder 31 of the vertical weighted averaging circuit 10, to be supplied as input data to the memory control circuit 33.

As described above, some of the lines of output values produced from the vertical weighted averaging circuit 10 may not contain valid vertical weighted average values, so that the vertical weighting coefficient and valid lines calculation circuit 8 also generates the "valid lines" signal, to indicate the line intervals in which valid sets of values are derived, as described hereinabove. That is supplied to the memory control circuit 33, together with the "valid data phase" signal from the horizontal weighting coefficient and valid data phase calculation circuit 5.

The vertical selection signal $HRD_{SEL}$ shown in FIG. 7 is produced from the vertical selection signal generating circuit 68, to be supplied to the vertical weighting coefficient and valid lines calculation circuit 8, together with control signals R', CTL1'. The configuration and operation of the vertical weighting coefficient and valid lines calculation circuit 8 are identical to those of the horizontal weighting coefficient and valid data phase calculation circuit 5, described in detail hereinafter.

The output memory 36 of this embodiment functions as a 2-line memory, i.e. two sets of addresses, each set being capable of storing one line of picture element values, and with memory being controlled by the memory control circuit 33 such that while data are being successively written into one of these sets of address, previously written data can be read out from the other set of addresses. Referring to FIG. 7, in which it is assumed that the memory write control signal is of "active low" logic type, the first burst of that control signal (coinciding with the line period $P_A'$ as shown) serves to write into the output memory 36 the first m valid values of the output data from the vertical weighted averaging circuit 10 that are within a valid line. That is to say, the values for the first line portion of the compressed region shown in FIG. 5 are written into the output memory 36, at intermittent intervals determined by the "valid data phase" signal. In the next line period, the data thus stored are consecutively read out from that set of addresses of the output memory 36, so that the horizontal time axis compression of these values is achieved. Next (in that same next line period, or after a gap of one or more line periods, depending upon the degree of vertical compression), the next m valid values in the next valid line are written into the other set of addresses, then are read out consecutively in the succeeding line period. That process continues with alternate writing and reading of the two memory sections, until the last valid line of the field. The data thus read out from the output memory 36 are transferred by the memory control circuit 33 to the output terminal 11, to be supplied to the receiving apparatus, e.g. a color printer.

In addition, as described hereinafter, the memory control circuit 33 of this embodiment functions to insert into the remaining portion (i.e. following m consecutive valid values) of each line read out from the output memory 36 a set of zero-value data, and to similarly insert a set of zero-value lines of data if necessary, following read-out of the last valid line from the memory. This is done to delimit the boundaries of the data for the compressed region, and to make the number of values per line, and the total number of lines, of the output data field become identical to those of the input data field applied to input terminal 12.

Figure 9:
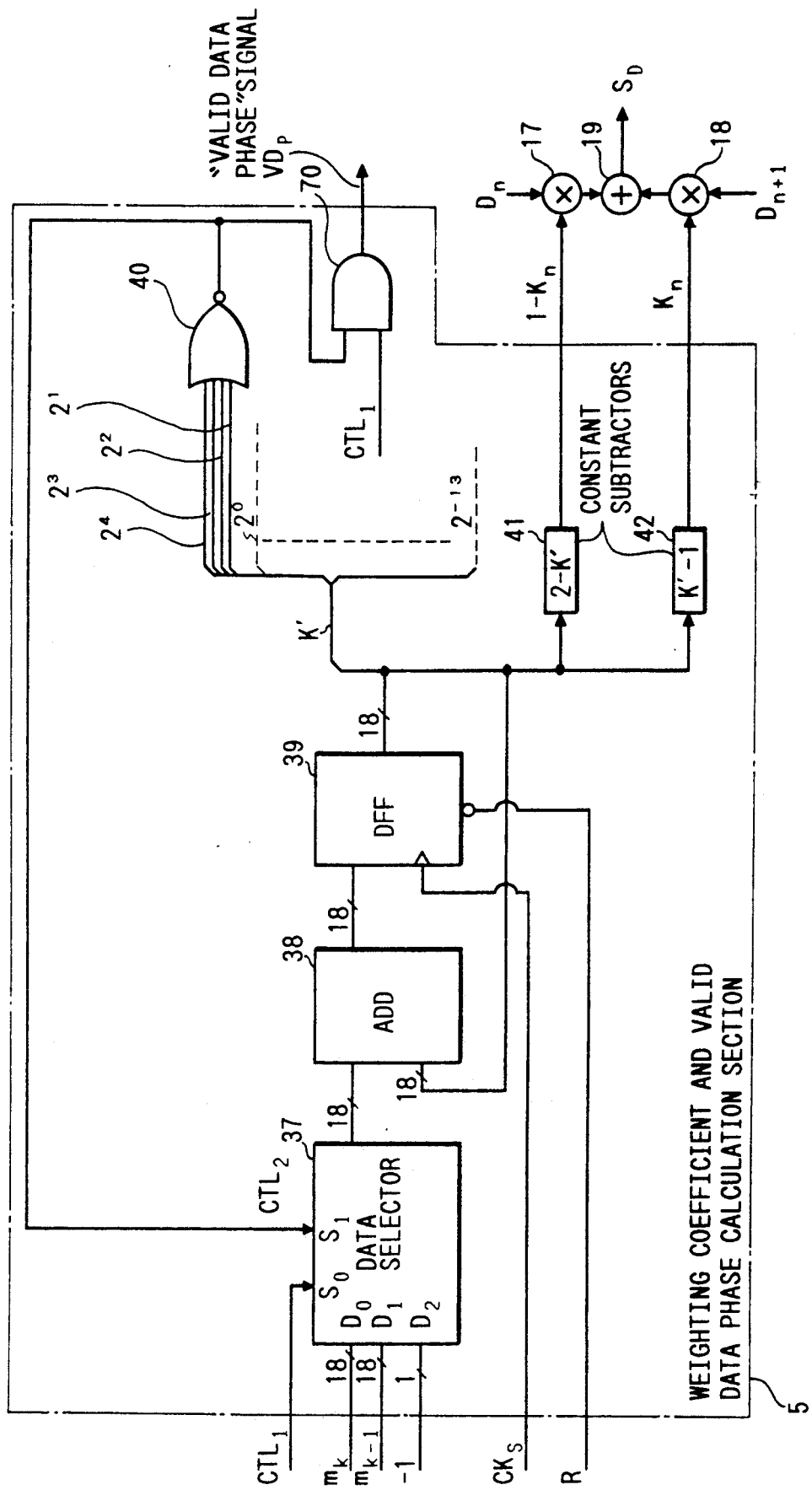
FIG. 9 is a circuit diagram of a weighting coefficient and valid data phase calculation section shown in FIGS. 8A, 8B.

FIG. 9 is a circuit diagram showing the internal configuration of the horizontal weighting coefficient and valid data phase calculation circuit 5 of FIG. 8A. Numeral 37 denotes a data selector which receives the parameter value $m_k$, a value $(m_k - 1)$, and $-1$, at respective data input terminals D0, D1 and D2, and which selects one of these three values to be outputted, in accordance with a combination of states of two control signals CTL1 and CTL2. CTL1 is generated by the vertical selection signal generating circuit 68 described above. The relationships between respective combinations of states of CTL1, CTL2 and corresponding selected outputs from the data selector 37 are as shown in the following table.

| CTL1 | CTL2 | Selected Output |
|------|------|-----------------|
| 0    | 1    | $m_k$           |
| 1    | 0    | $-1$            |
| 1    | 1    | $(m_k - 1)$     |

The output from the data selector 37 is supplied to one input of an adder 38, whose output is applied to the data input of a D-type flip-flop 39. The horizontal selection signal $CK_{SEL}$ is applied to the clock input of the D-FF 39, and the reset signal R to the reset input terminal.

It should be understood that although only three blocks 37, 38 and 39 are shown in FIG. 9, since the bits (in this example, 18 bits) of each of the sequential R, G, B color values of each picture element value are processed in parallel, only the blocks required to process one of these 18 bits is shown, i.e. there are actually 18 parallel sets of these blocks 37, 38 and 39 provided.

The output from the D-FF 39 is applied to the other input of the adder 38. The most significant four bits of each (18-bit) value thus produced from the parallel set of D-FFs 39 are inputted to a NOR gate 40. The LSB is assigned the value $2^{-13}$, so that the four most significant bits have the values $2^4$, $2^3$, $2^2$ and $2^1$. Thus the NOR gate 40 produces an output at the high logic level only if the magnitude of the output value produced from the set of D-FFs 39 is less than 1. That output from the NOR gate 40 constitutes the control signal CTL2 that is supplied to the data selector 37 (i.e. applied to each of the parallel set of 18 data selectors 37). The 18-bit output value produced from the D-FFs 39, designated as K', is supplied to two constant subtractor circuits 41, 42, which produce as outputs the respective values (2−K') and (K'−1). These respectively constitute the weighting coefficients $(1-K_n)$ and $K_n$ which are supplied to the multipliers 17, 18 of the horizontal weighted averaging circuit 6 respectively.

The output signal from the NOR gate 40 is also applied to one input of an AND gate 70, with the control signal CTL1 being applied to the other input, to thereby obtain the "valid data phase" signal as the output from AND gate 70.

Figure 10:
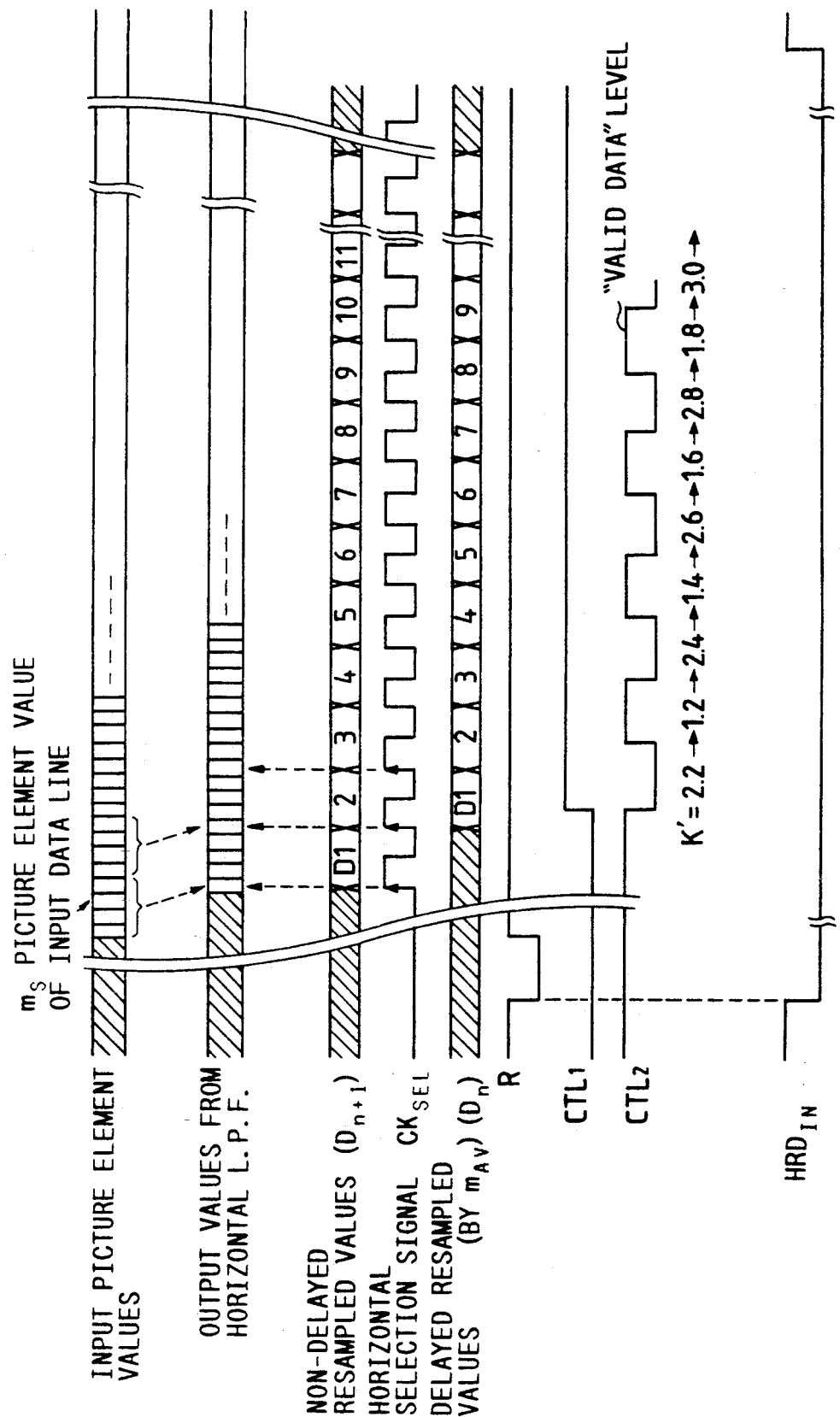
FIG. 10 is a timing diagram for describing the operation of the circuit of FIG. 9.
Figure 11:
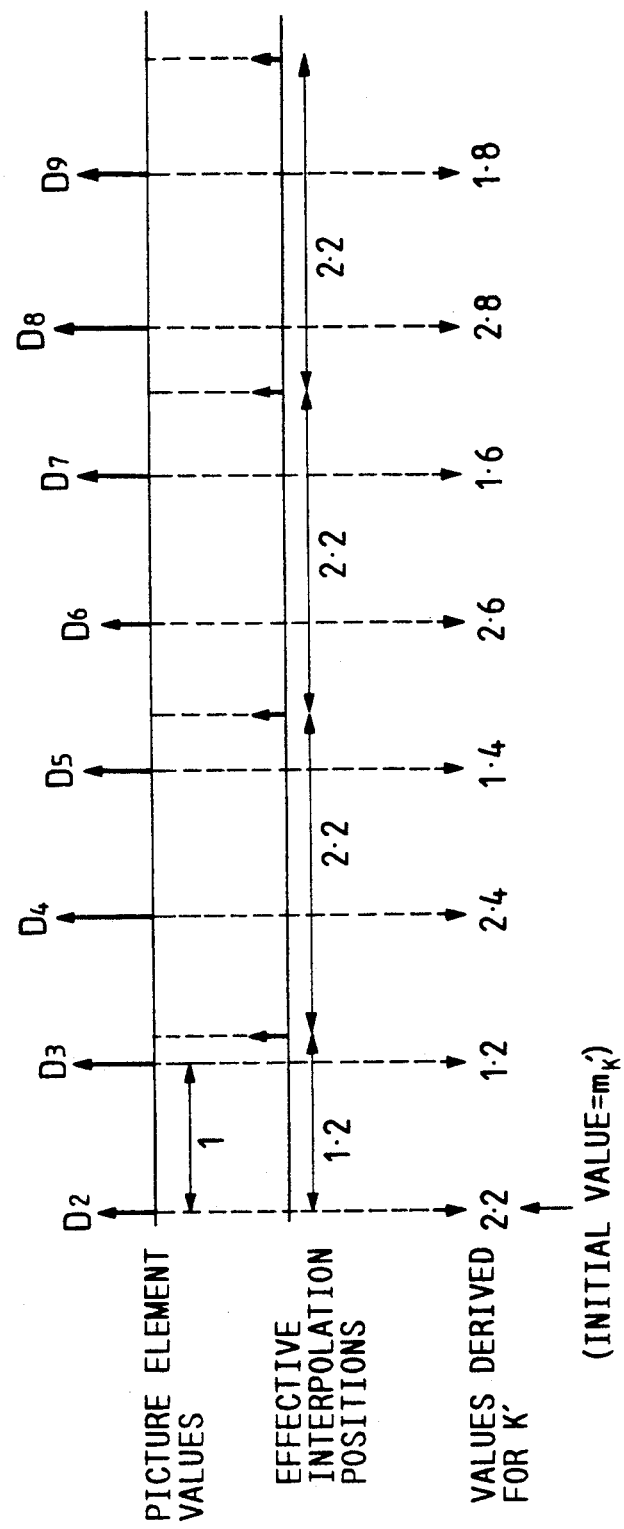
FIG. 11 is a conceptual timing diagram for assistance in describing the operation of the circuit of FIG. 9.

The operation of the circuit of FIG. 9 will be described referring to the timing diagrams of FIGS. 10 and 11. FIG. 10 also illustrates the relationships between the start of the selected region in each line (i.e. at the $m_s$ picture element value in the line), subsequent output values produced from the horizontal LPF circuit, and the parallel pairs of delayed and non-delayed resampled values that are produced by the resampling circuit 15. In the $v_s$ line interval and subsequent line intervals, the signal $CK_{SEL}$ commences immediately after the start of the region selected by the gate circuit 2 (i.e. following the $m_s$ input value supplied to input terminal 12, and continues to the end of the line. The resampled non-delayed picture element values produced from the resampling circuit 15, i.e. $D_{n+1}$ values, are shown numbered as 2, 3, 4, . . . from the start of the $CK_{SEL}$ signal, while the corresponding delayed values are numbered as 1, 2, 3, . . . from the start. Each of these has been obtained by resampling, i.e. selection of one out of $m_{AV}$ successive values produced from the horizontal low pass filter 3. The signal CTL1 goes to the high level during the first pair of parallel values produced from the resampling circuit 15 at the start of the line interval, and remains high to the end of that line interval. As described above, the signal CTL2 will go to the high logic level only if the output value K' from the D-FFs 39 is less than 2. In this example it is assumed that the value of $m_k$ is 2.2. Thus, CTL2 first goes from the high to low level in synchronism with the initial transition of CTL1, and remains at that level until the value K' becomes less than 2, then returns to the high level.

Each time that K' takes a value that is less than 2, this indicates that a valid weighted average value can be derived by operating on the pair of values that are currently being outputted from the resampling circuit 15. This will be described referring to the timing diagram of FIG. 11. As shown, the successive values generated for K' by this circuit establishes successive effective interpolation positions for weighted averaging which occur with a period of 2.2 (measured in units of periods of signal $CK_{SEL}$). Initially, K' takes the same value as $m_k$, i.e. 2.2, then in the next period becomes 1.2, so that CTL2 (and hence the "valid data phase" signal) go to the high level. This indicates that a valid weighted average value will be obtained using the current picture element value D2 and the delayed value D3, applying the weighting coefficients that are calculated by using the value 1.2 for K'. Similarly, when K' subsequently takes the value 1.4, this indicates that a valid weighted average value will be obtained using the current picture element value D5 and the delayed value D4, applying the pair of weighting coefficients that are calculated by using the value 1.2 for K'.

It can thus be understood that the circuit of FIG. 9 functions to generate the weighting coefficients $(1-K_n)$ and $K_n$ to be supplied to the horizontal weighted averaging circuit 6 while at the same time generating information (the level of the "valid data phase" signal) to indicate whether or not a valid horizontal weighted average value will be derived as a result.

Figure 12:
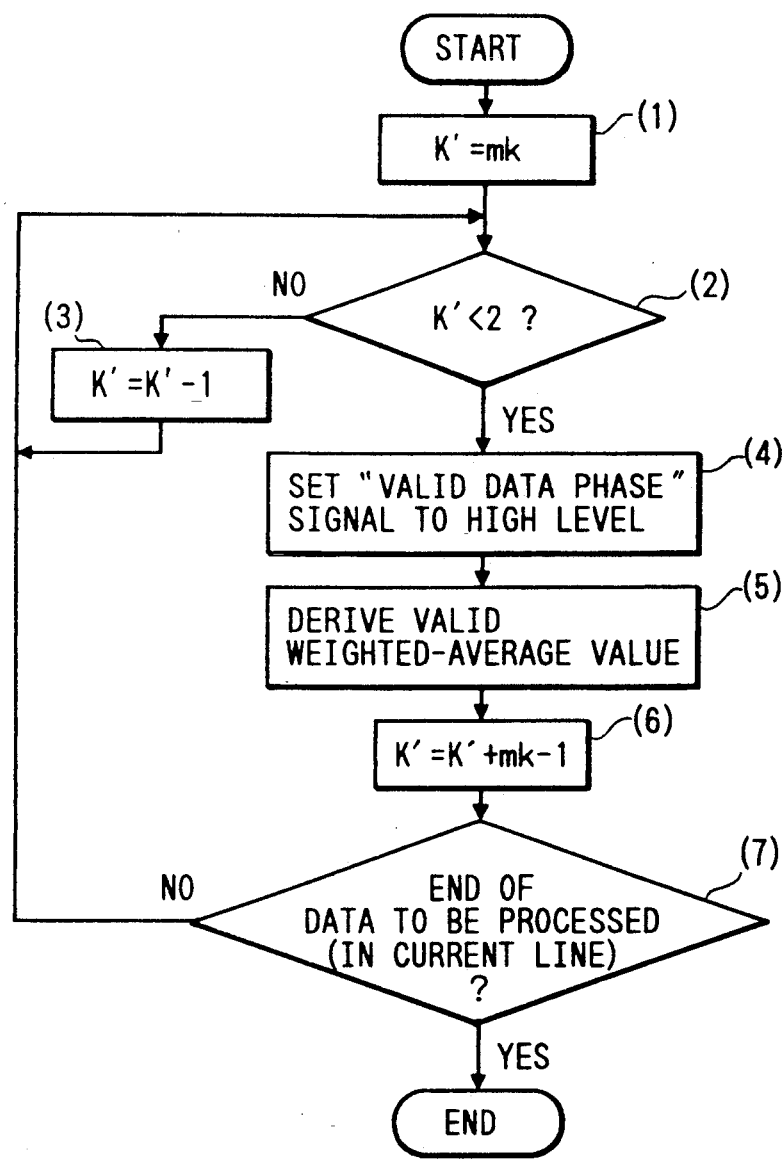
FIG. 12 is a general flow diagram for describing the operation of the circuit of FIG. 9.

The operations executed by the circuit of FIG. 9 are illustrated in the flow chart of FIG. 12. Following initial reset at the start of each line interval, the value of K' is first set to $m_k$. If it is then found that K' is not greater than 2, the "valid data phase" signal does not go to the high level in that data period, and the value of K' is then set of (K'−1). If it is then found in the next period that K'<2, then the "valid data phase" signal is set to the high level, weighting coefficients are calculated from the value of K' and a horizontal weighted average value is derived using the current picture element value and delayed value that are being supplied at that time to the horizontal weighted averaging circuit 6, then K' is changed to the value $K'+m_k-1$. If the end of the line has not yet been reached, the above operations are then repeated for the next data period.

The operation of the vertical weighting coefficient and valid lines calculation circuit 8 is identical to that of the horizontal weighting coefficient and valid data phase calculation circuit 5, so that further description will be omitted. However when a new weighting coefficient value $(1-K_n')$ is produced from the vertical weighting coefficient and valid lines calculation circuit 8, that value is applied to multiply each of the successive values that are produced from vertical low pass filter circuit 7 as the current line ($L_{n+1}$), while the corresponding new weighting coefficient value $K_n'$ is applied to multiply each of the successive values that are produced from the $L_{AV}$ delay circuit 9 as the delayed line ($L_n$).

Figure 13:
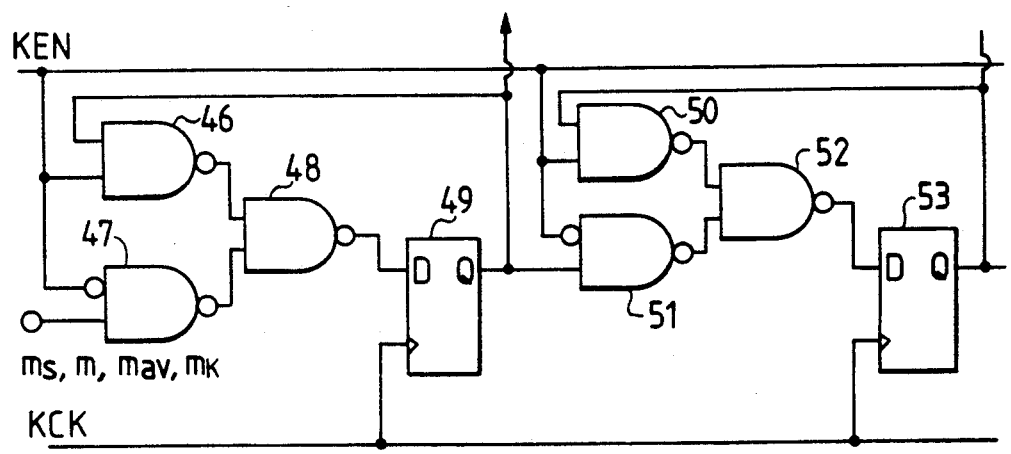
FIG. 13 is a partial circuit diagram of a shift register circuit in the circuit of FIGS. 8A, 8B which serves to hold and supply parameter values.

FIG. 13 shows an example of a partial circuit diagram of the shift register 23. The bits of each of the values $m_s$, $m_k$, $m_{AV}$, $m_k$ etc. are successively shifted through gate circuits formed of NAND gates 46, 47, 48, and set into one of the D-FFs 49, 53 etc, under the control of the shift clock KCK as illustrated in FIG. 14. The data format for these values $m_s$, $m_k$, $m_{AV}$, $m_k$ etc. may be of the form shown in FIG. 15, for example.

It will be understood that various ways can be envisaged for using the horizontally and vertically density-reduced data produced from the vertical weighted averaging circuit 10 of this embodiment. It is only necessary for the apparatus receiving the output data to receive, in addition to the output data data:

(a) Horizontal and vertical synchronizing signals corresponding to the output data field, (and, in general, a data clock signal); and (b) Information specifying the boundaries of the data representing the compressed region, within the output data field.

Figure 16A:
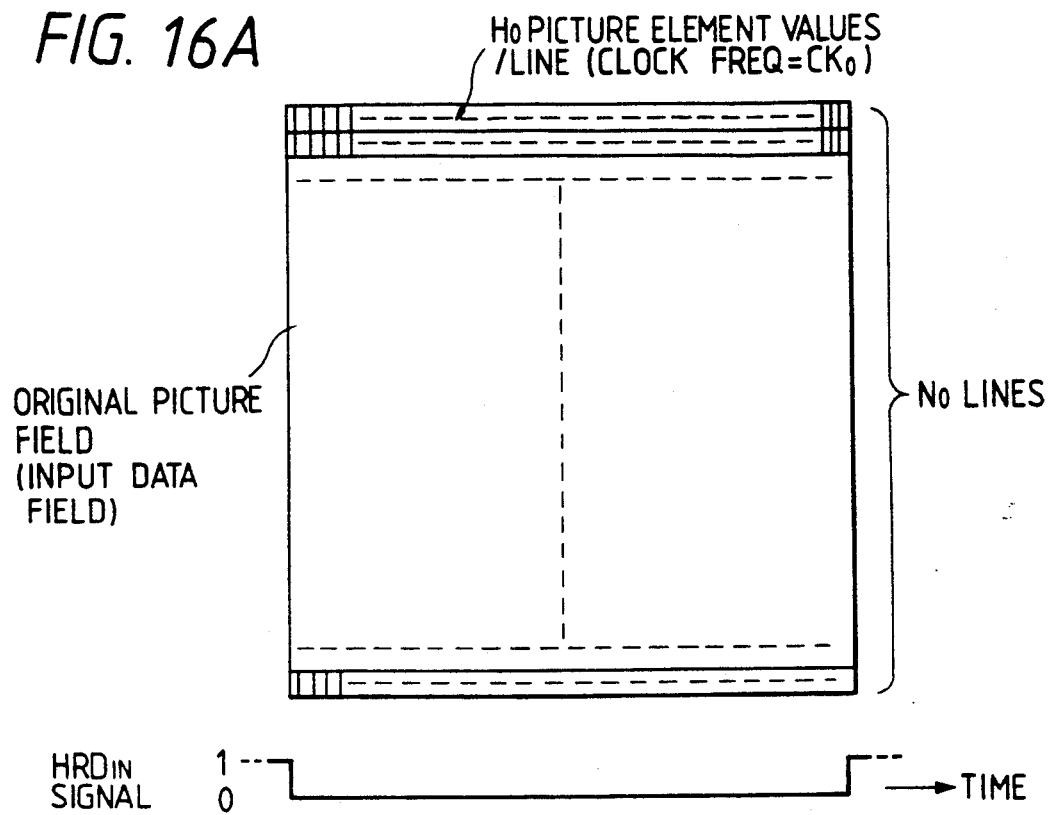
FIGS. 16A to 16E are data field diagrams for describing the generation of an output data field from the circuit of FIGS. 8A, 8B, in which all picture element values other than those of a region to be compressed are set as zero.
Figure 16B:
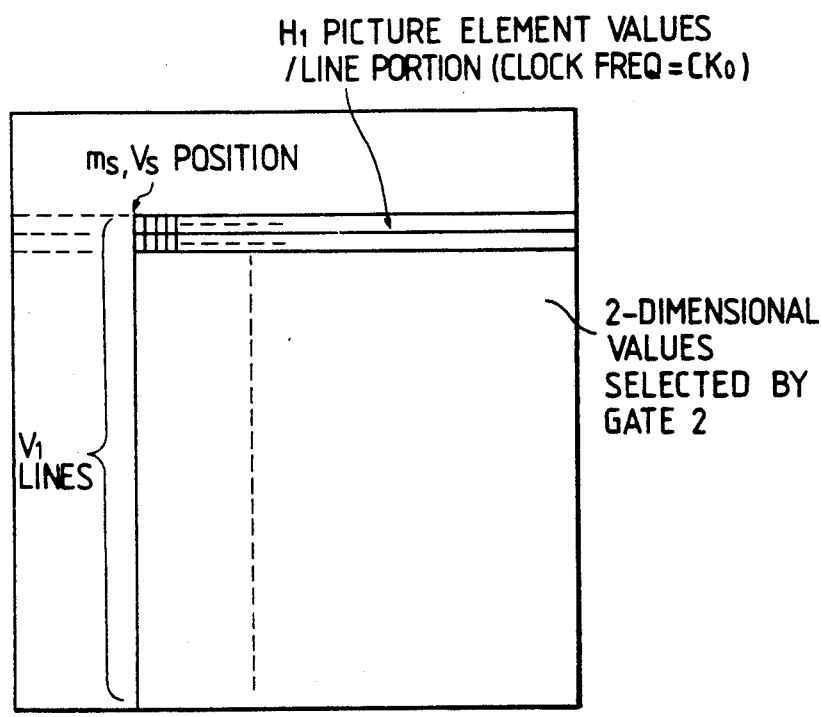
Figure 16C:
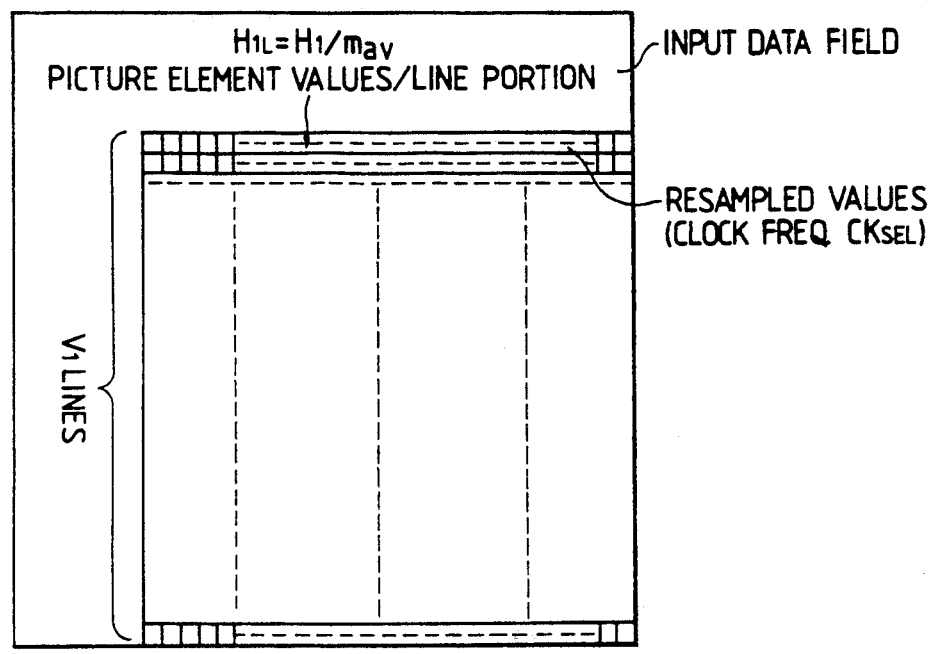
Figure 16D:
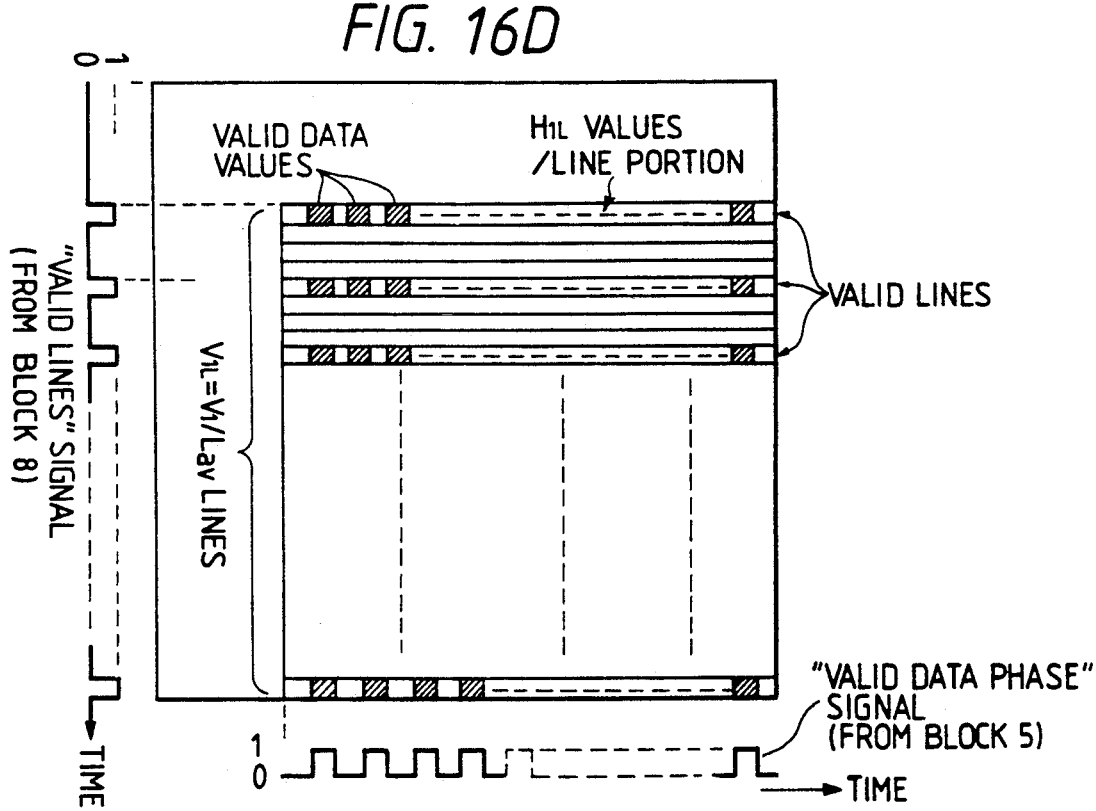
Figure 16E:
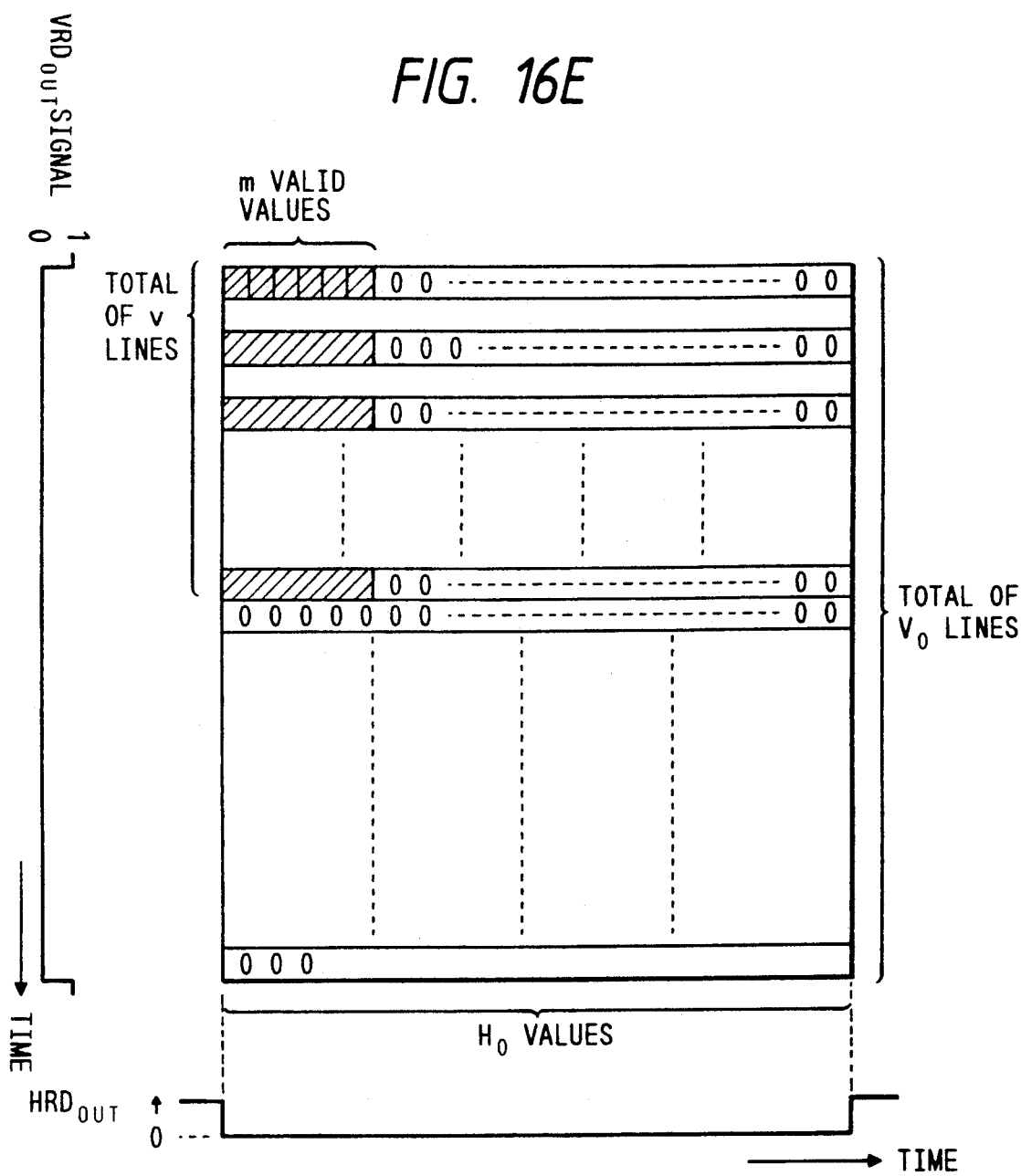

The above assumes that the compressed region will always disposed at a fixed position in the output data field, so that no position-specifying information is required. The compressed region boundaries information could consist of the horizontal and vertical parameters m and v, or as in this embodiment can be defined by filling all of the output data field (other than the compressed region data) with zero values or other fixed values. The following description assumes that such insertion of zeros into the output data field is executed, and that the output data field contains the same number of values as the input field supplied to input terminal 12, and also that the compressed region is positioned in the upper left corner of the output data field. The operation will be described referring to FIGS. 16A to 16E. The input data field supplied to input terminal 12 is illustrated in FIG. 16A, made up of V0 lines of H0 picture element values, at the input data rate of clock signal $CK_{IN}$. The region selected by the region selection gate circuit 2 in conjunction with the horizontal selection signal generating circuit 62 and vertical selection signal generating circuit 68 is illustrated in FIG. 16B. The filtered and resampled values produced from the resampling circuit 15 are illustrated in FIG. 16C. The data rate of the resampled values is now that of the signal $CK_{SEL}$, and each line portion of the selected region is made up of $H1/m_{AV}$ resampled values. The results from the vertical filtering operation in conjunction with the "valid lines" signal and the "valid data phase" signal are illustrated in FIG. 16D. Although a total of approximately V1L lines will be outputted from the vertical filter circuit, only those lines for which valid weighted average values are derived are designated by the "valid lines" signal, as illustrated, while in addition, for each of the lines thus designated, the "valid data phase" signal designates the respective valid horizontal weighted average values within each line. The memory control circuit 33 controls the write-in operations for the output memory 36 based on the "valid data phase" signal and "valid lines" signal so that only the valid weighted average values within each valid line of the output data from the vertical weighted averaging circuit 10 are written into the output memory. During read-out, the first m values of each line are read out consecutively from the output memory 36, as illustrated in FIG. 16E. Thereafter, the memory control circuit 33 inserts (H0−v) successive zero values, to make the total number of values for that line of the output field become H0, i.e. identical to that of the input data field. That is repeated for each of the first v lines that are read out. The memory control circuit 33 then generates (V0−v) successive zero values, to make the total number of lines of the output data field become V0.

The above operation is illustrated in the timing diagram of FIG. 17. The output horizontal synchronizing signal $HRD_{OUT}$ is only set to the active (low) level while a line is being read out from the output memory 36. At the apparatus (e.g. a color printer) which receives the output data field, the data are written into an input buffer memory under the control of the $HRD_{OUT}$ signal, so that any gaps between successive lines will be eliminated when the data are subsequently read out from that input buffer, i.e. vertical time axis compression will be achieved.

It will be understood that although such a form of operation has the advantage of only a small amount of capacity being required for the output memory, that operation would not be applicable to processing sequentially consecutive input data fields applied to the input terminal 12, since the duration of an output field may be longer than that of the input field, and the duration will vary in accordance with the degree of vertical compression and size of the region to be compressed. If such a zeros-insertion method were to be used in the case of processing immediately consecutive input fields (e.g. of a video signal), it would be necessary to provide a pair of field memories as the output memory 36, with successive output data fields being alternately written into and read out of these field memories, to achieve both horizontal and vertical time axis compression.

However if such a zeros-insertion feature is not used, it is possible to apply the above embodiment, using only a 2-line output memory capacity, to processing moving-picture consecutive-field data. That can be done by sending to the receiving apparatus (e.g. video display unit) together with each output field, the values v and m which specify the boundaries of the compressed region. In that case, for example all of the valid data of a line that are written into the output memory 36 in a line interval are consecutively read out in the succeeding line interval. Each valid line portion (i.e. all of the valid values with H1L values as shown in FIG. 1D) read out from the memory constitutes the start of a line (of H0 values) of the output data field, with the remaining contents of the line being irrelevant. Similarly, after all of the valid lines within the V1L lines (as shown in FIG. 16D) have been read out from the output memory 36, the contents of the remaining lines of the output data field are irrelevant, so long as the total number of lines is V0. As each output data field is received by the receiving apparatus, only the first m values of the first v lines of the field are selected to be written into (or read out of) the input buffer memory of that apparatus, to be subsequently displayed.

Alternatively, a memory capable of storing one field could be used as the output memory, with only the valid data within the valid lines of each field of processed data being written into the output memory. In that case, both horizontal and vertical compression of the density-reduced (valid) data becomes possible, and the method is applicable to real-time processing of a moving picture signal (i.e. in the field interval following each input data field supplied to the apparatus, a resultant processed field is read out from the output memory). In that case for example, each output field (containing compressed-region data) can be sent to the receiving apparatus together with the parameters m and v which determine the boundaries of the compressed region, and the values for that region can then be selected to be written into the input buffer memory of that apparatus.

It can thus be understood that various methods of utilizing the data values obtained by sequential horizontal and vertical data density reduction by the present invention could be envisaged, other than those described above. The essential features of the invention lie in the means for achieving the data density reduction.

It should be noted that it would be equally possible to execute vertical data density reduction first, followed by horizontal data density reduction.

In addition, the described embodiment could be simplified in various ways. For example it would be possible to execute horizontal and vertical data density reduction throughout the entire input data field (i.e. without using the region selection gate circuit 2, and making the selection signals $CK_{SEL}$ and $HRD_{SEL}$ continuous during the field). In that case, valid lines that are written into the output memory 36 would begin at the first valid line (indicated by the "valid lines" signal) to occur after the $v_s$ line of the input data field supplied to input terminal 12, and the valid values in each of these lines which are written into the output memory 36 would begin at the first valid value (indicated by the "valid data phase" signal) to occur after the $m_s$ picture element value of the input data field.

Alternatively, it would be possible to eliminate the horizontal data resampling circuit 15, since that is not inherently necessary. However that would bring the disadvantage of requiring a higher speed of operation of the multipliers 17, 18 of the horizontal weighted averaging circuit 6.

A picture element data density conversion apparatus according to the present invention, used for image region compression, brings the following advantages:

(a) A very wide range of degrees of compression can be achieved.

(b) Respective degrees of horizontal and vertical compression can be independently predetermined.

(c) By comparison with prior art methods of data density reduction and image region compression, there is a reduction in the amounts of unwanted spurious patterns which may occur in the finally printed or displayed compressed region, i.e. due to spurious signal components produced as a result of the data density reduction process. In addition, if necessary it is easy to determine a combination of values for the parameters $m_{AV}$, $m_k$, $L_{AV}$ and $L_k$ which will result in a minimum of unwanted patterns being produced for a particular picture.

(d) As described above, since all of the density-reduced data can be generated within each input data field interval, real-time processing is possible, so that the invention is applicable to processing moving picture (video) data.

It should be noted that the terms "horizontal" and "vertical" as used hereinabove and in the appended claims in referring to arrangements of values in a 2-dimensional picture data field are to be understood as signifying a main scanning direction and a secondary scanning direction respectively of the field.

What is claimed is:

1. A picture element data density conversion apparatus for processing successive input picture element values to effect a reduction of picture element data density within a 2-dimensional input data field formed of a plurality of lines of said input picture element values, each line being oriented in a horizontal scanning direction of the field, and the lines being sequentially arranged in a vertical scanning direction of the field, said input picture element values occurring with a fixed input data period, said lines occurring with a fixed line period, the apparatus comprising:

horizontal digital low pass filter means (3) for operating on said input picture element values to obtain respective horizontally filtered picture element values;

first delay means (14) for delaying said horizontally filtered picture element values by a delay amount which is equal to said input data period multiplied by a first predetermined integer ($m_{AV}$), to obtain successive parallel pairs of delayed and non-delayed horizontally filtered picture element values;

horizontal selection means (62) for generating a horizontal selection signal ($CK_{SEL}$) for periodically designating respective ones of said pairs of delayed and non-delayed horizontally filtered picture element values, said designation being executed with a horizontal selection period which is equal to said input data period multiplied by said first predetermined integer ($m_{AV}$);

horizontal weighting coefficient generating means (5) responsive to said horizontal selection signal ($CK_{SEL}$) for detecting, in accordance with a predetermined weighted averaging interpolation period which is a predetermined multiple ($m_k$) of said horizontal selection period, each of said horizontally filtered delayed and non-delayed picture element value pairs designated by said horizontal selection means for which a valid horizontal weighted average picture element value can be derived, for generating a first validity indication signal in synchronism with said each picture element value pair for which a valid weighted average value can be derived, and for computing respective horizontal weighting coefficients to be applied to said each picture element value pair;

horizontal weighted averaging means (6) for applying said horizontal weighting coefficients to corresponding ones of said pairs of horizontal filtered delayed and non-delayed picture element value pairs, to sequentially derive respective horizontal weighted average picture element values;

vertical digital low pass filter means (7) for operating on said horizontal weighted average picture element values to obtain respective vertically filtered picture element values;

second delay means (9) for delaying said horizontally filtered picture element values by a delay amount which is equal to said line period multiplied by a second predetermined integer ($L_{AV}$), to obtain successive parallel pairs of lines of delayed and non-delayed vertically filtered picture element values;

vertical selection means (68) for generating a vertical selection signal ($HRD_{SEL}$) for periodically designating respective ones of said pairs of lines of delayed and non-delayed vertically filtered picture element values, said designation being executed with a period which is equal to said line period multiplied by said second predetermined integer ($L_{AV}$);

vertical weighting coefficient generating means (8) controlled by said vertical selection signal ($HRD_{SEL}$) for detecting, in accordance with a predetermined weighted averaging interpolation period ($L_k$), each of said vertically filtered delayed and non-delayed picture element value line pairs designated by said vertical selection means for which valid vertical weighted average picture element values can be derived, for generating a second validity indication signal in synchronism with said each line pair for which valid vertical weighted average values can be derived, and for computing a first vertical weighting coefficient to be applied to each picture element value of a first one of said each line pair and a second vertical weighting coefficient to be applied to each picture element value of a second one of said each line pair; and vertical weighted averaging means (10) for applying said vertical weighting coefficients to corresponding ones of said line pairs, to sequentially derive respective lines of vertical weighted average picture element values.

2. A picture element data density conversion apparatus according to claim 1, further comprising 2-dimensional region selection gate circuit means (2) for selecting respective ones of said input picture element values which constitute a predetermined region formed of a plurality of successive line portions within said input data frame, and for supplying only said selected input picture element values to said horizontal low pass filter means, and means for controlling said horizontal weighting coefficient generating means and vertical weighting coefficient generating means to generate said first and second validity indication signals only at positions in said input data field that are within said predetermined region.

3. A picture element data density conversion apparatus according to claim 1, further comprising resampling circuit means (15) controlled by said horizontal selection means for selecting said designated pairs of delayed and non-delayed horizontally filtered values, to produce two parallel trains of delayed and non-delayed horizontally filtered values each having a period that is equal to said horizontal selection period, and for supplying said two trains of values to said horizontal weighted averaging means.

4. A picture element data density conversion apparatus according to claim 1, further comprising memory means (36), and memory control circuit means (33) coupled to receive said vertical weighted average picture element values produced from said vertical weighted averaging means (10), said memory control circuit means being controlled by at least one of said first and second validity designating signals for selectively writing valid weighted average values produced from said vertical weighted averaging means into said memory means.

5. A picture element data density conversion apparatus according to claim 4, wherein said memory control circuit means functions to read out from said memory means only a predetermined number of picture element values within each of a predetermined number of successive lines of picture element values written into said memory means, said predetermined number of picture element values and predetermined number of lines defining a region within an output data field, said region being thereby derived by compressing a predetermined region within said input data field by an amount in the horizontal direction that is the product of said first predetermined integer ($m_{AV}$) and said predetermined multiple ($m_k$) of the horizontal selection period, and by an amount in the vertical direction that is the product of said second predetermined integer ($L_{AV}$) and said predetermined multiple ($L_k$) of the vertical selection period.

6. A picture element data density conversion apparatus according to claim 4, wherein said memory means comprises two memory regions each having a storage capacity equal to at least one line of said input data field, and wherein said memory control circuit means executes mutually alternating writing and reading of said vertical weighted average values to and from said two memory regions in successive line intervals.

7. A picture element data density conversion apparatus according to claim 1, wherein a frequency characteristic of said horizontal low pass filter means is controlled in accordance with said first predetermined integer ($m_{AV}$) and wherein a frequency characteristic of said vertical low pass filter means is controlled in accordance with said second predetermined integer ($L_{AV}$).

8. A picture element data density conversion apparatus according to claim 7, wherein each of said filtered picture element values produced from said horizontal low pass filter means is derived as an average of an integral number of successive ones of said input picture element values, said integral number being equal to said first predetermined integer ($L_{AV}$).

* * * * *